US008526743B1

(12) United States Patent
Campbell et al.

(10) Patent No.: US 8,526,743 B1
(45) Date of Patent: Sep. 3, 2013

(54) DEFINED DATA PATTERNS FOR OBJECT HANDLING

(75) Inventors: David Peter Campbell, Redmond, WA (US); David Justin Ross, Redmond, WA (US); Brian J. Elmenhurst, Redmond, WA (US); Kevin James Saur, Redmond, WA (US); Richard Clark Teudt, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 467 days.

(21) Appl. No.: 12/917,371

(22) Filed: Nov. 1, 2010

(51) Int. Cl.
*G06K 9/68* (2006.01)

(52) U.S. Cl.
USPC .......................................... 382/218; 382/181

(58) Field of Classification Search
USPC ................. 382/100, 101, 102, 181, 218, 231; 705/401
See application file for complete search history.

(56) References Cited

U.S. PATENT DOCUMENTS

| 5,703,783 | A | 12/1997 | Allen et al. | |
|---|---|---|---|---|
| 6,246,794 | B1* | 6/2001 | Kagehiro et al. | 382/185 |
| 7,436,979 | B2* | 10/2008 | Bruce et al. | 382/101 |
| 7,680,306 | B2 | 3/2010 | Boutant et al. | |
| 7,853,792 | B2 | 12/2010 | Cowburn | |
| 8,180,174 | B2 | 5/2012 | Di Venuto et al. | |
| 2001/0054031 | A1 | 12/2001 | Lee | |
| 2003/0208298 | A1 | 11/2003 | Edmonds | |
| 2005/0065719 | A1 | 3/2005 | Khan | |
| 2005/0086256 | A1 | 4/2005 | Owens | |
| 2005/0131576 | A1 | 6/2005 | DeLeo | |
| 2007/0094155 | A1 | 4/2007 | Dearing | |
| 2007/0282900 | A1 | 12/2007 | Owens | |
| 2008/0255758 | A1 | 10/2008 | Graham | |
| 2009/0157733 | A1 | 6/2009 | Kim | |
| 2009/0271029 | A1 | 10/2009 | Doutre | |
| 2009/0307005 | A1 | 12/2009 | O'Martin | |

FOREIGN PATENT DOCUMENTS

WO 2012145842 A1 11/2010

OTHER PUBLICATIONS

Stolowitz Ford Cowger LLP, Listing of Related Cases, Nov. XX, 2010.
Stolowitz Ford Cowger LLP List of Related Matters dated Dec. 23, 2011.

* cited by examiner

*Primary Examiner* — Edward Park
(74) *Attorney, Agent, or Firm* — Stolowitz Ford Cowger LLP

(57) ABSTRACT

A method of defining data patterns for object handling includes obtaining an image of an input data area, processing the image to obtain image data, and comparing the image data with a pattern, wherein the pattern identifies spatial information of corresponding pattern fields of the pattern. The method further includes determining a confidence level of the comparison of the image data according to a success in matching the image data with the pattern fields, comparing the confidence level with a confidence threshold associated with the pattern, and selecting the pattern. A pattern output associated with the selected pattern is identified, wherein the pattern output corresponds to a canonical return format, and the pattern output is applied to the image data.

20 Claims, 13 Drawing Sheets

FIG. 9

DEFINED DATA PATTERNS FOR OBJECT HANDLING

COPYRIGHT NOTICE

© 2010 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and apparatus for identifying, sorting, delivering, or classifying objects, such as mail pieces and parts, including addresses, identifications, and labels.

BACKGROUND OF THE INVENTION

On Average 20% of the overall mail stream is unrecognizable due to misspelling, abbreviated street & city names, and/or improperly addressed or structured. Current directories require a tradeoff in adaptability & record volume vs. performance by forcing the user to incorporate stringent data management policies to achieve high address assignment rates.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one embodiment, a system presents a set of images of mail pieces or other input with each one parsed into lines and regions and each component labeled with what the component is (e.g. STATE, ZIP, ADDRESSEE NAME). After such parsing and labeling, the system then takes the parsed and labeled set of images and deduces the allowed patterns in the addresses for that country (or incoming application). The system provides the ability to extract the patterns automatically from such a labeled set of images.

In another embodiment, a system utilizes an optical character recognition OCR Engine to assign matched and verified addresses to more outgoing or incoming mail by accurately adapting and correcting various degrees of address corruption. The system reduces the level of character noise, extracts all relevant envelope data, and then uses fuzzy logic, sophisticated pattern matching algorithms, and flexible search rules to maximize the number of assignments.

The system may be configured to identify or categorize information associated with part labels or mail addresses for purposes of routing the object (e.g. mail), monitoring inventory or parts usage, identifying or selecting a common canonical format compatible with a plurality of different labeling formats, identifying missing or ambiguous information, and associating related or corresponding information in a database.

In another embodiment, a system comprises an device configured to obtain an image of a mail piece being sorted, delivered, or classified. An image recognition device is configured to process the image into image data, and a processor is configured to compare the image data with a pattern, wherein the pattern identifies spatial information of corresponding pattern field elements. The processor may further be configured to determine a confidence level of the comparison of the image data according to a success in matching the image data with the pattern fields and compare the confidence level with a confidence threshold associated with the pattern. If the confidence threshold is met, the pattern is selected. The processor identifies a pattern output associated with the selected pattern, wherein the pattern output corresponds to a standardized mail address format. The system may further comprise an output device configured to apply the pattern output to the mail piece according to the selected pattern.

Additional aspects and advantages of this invention will be apparent from the following detailed description of preferred embodiments, which proceeds with reference to the accompanying drawings.

BRIEF DESCRIPTION OF THE DRAWINGS

FIG. 9 illustrates the mail processing system using the directory system's fuzzy logic to return verified and matched information associated with an image of an address.

DETAILED DESCRIPTION OF PREFERRED EMBODIMENTS

Figure 1:
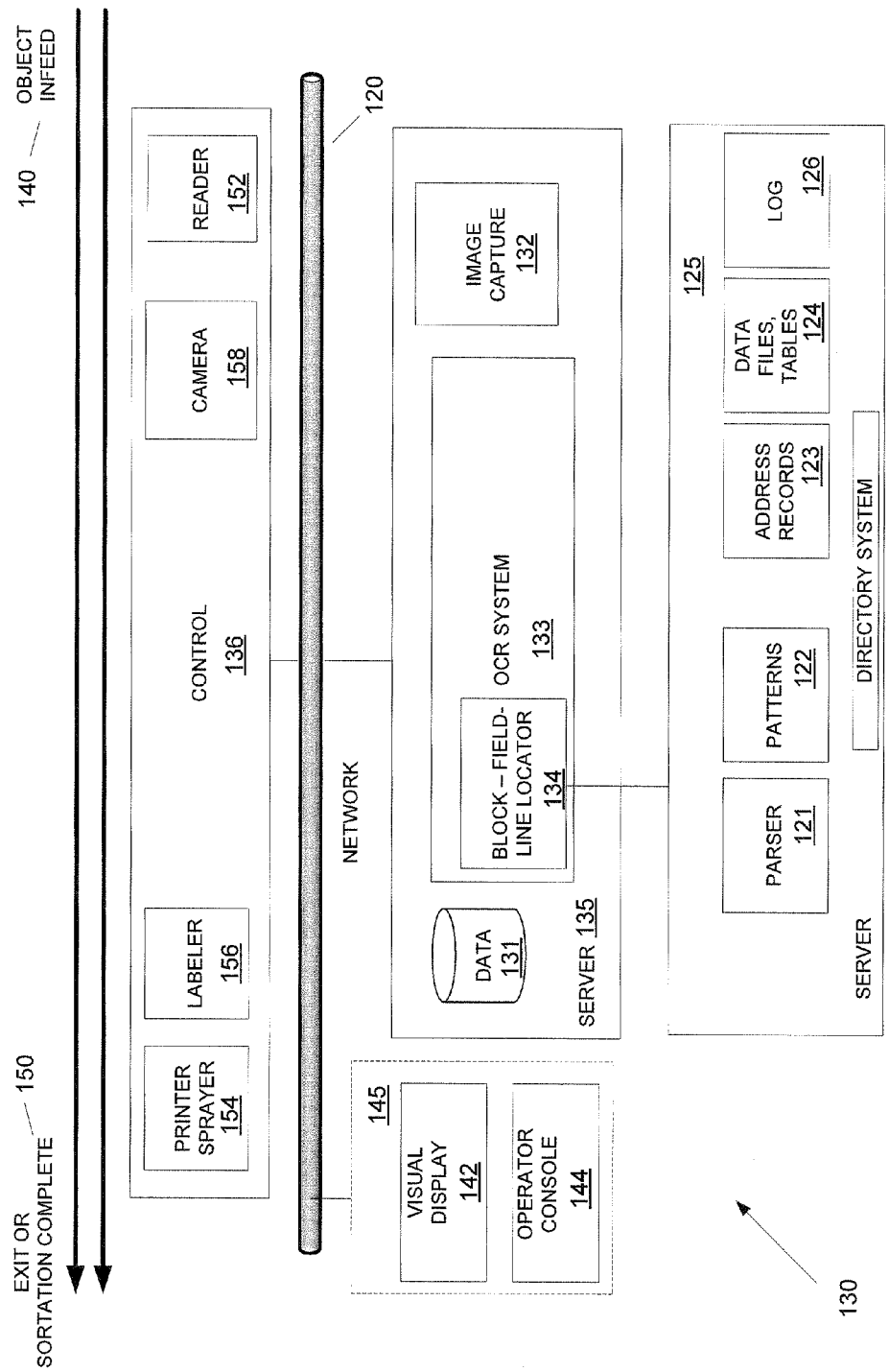
FIG. 1 illustrates an object handling or directory system configured to image and identify, sort, deliver, and/or otherwise classify an object.

FIG. 1 illustrates an object handling or directory system 130 configured to image and identify, sort, deliver, and/or otherwise classify an object. Objects to be analyzed, identified, sorted, delivered, or classified are fed into the system 130 at the object infeed 140 before being processed and ultimately removed at the exit or as sortation completes 150. The object may be processed or operated on by any or all of a control 136, reader 152, camera 158, printer/sprayer 154, and/or a labeler 156.

A directory system 125 is illustrated as including a parser 121, patterns 122, address records 123, data files and tables 124, and one or more logs 126. An image processing system 135 is illustrated as including a database 131, image capture block 132, and an OCR system 133, that includes a block field line locator 134. An interface system 145 is illustrated as including a visual display 142 and operator console 144. A network 120 may operatively connect the directory system 125, image processing system 135, and interface system 145. A sortation device may be used to physically move, deliver, or sort the objects through the system 130.

The system 130 may be configured to present a set of images of mail pieces, each one to be parsed into regions of interest and then lines of text with each identified component ultimately to be matched with what the component is (e.g. STATE, ZIP, ADDRESSEE NAME). The customer has provided an address block description or pattern 122, Address Records 123 and other Data Files and Tables 124. The OCR system 133, uses the Block-Field-Line Locator 134 to identify a region of interest or Address Block and subsequently the individual lines within that Address Block data. This line data is passed on to the Directory System 125, which is then uses the customer supplied patterns 122, data files 124, address records 122 and parser 121 to identify individual address components and addresses in each image. The individual components found on the images are identified. This identification is not with what they say, but with what they are or what they were meant to be. For example, the label labels the entity that says "Washington" with "STATE".

Included in such parsing, the system 130 takes the parsed image data and deduces the allowed patterns in the addresses for that area (or category). For example, it can be determined that the bottom-most line (the parser detects lines) has the rightward-most entity labeled "ZIP-5", the one to the right of that labeled "STATE" and the remaining, leftward-most entity labeled "CITY". It can therefore be deduced that CITY→STATE→ZIP on the bottom-most line is an allowed pattern that may be matched.

The Physical Object

Figure 2:
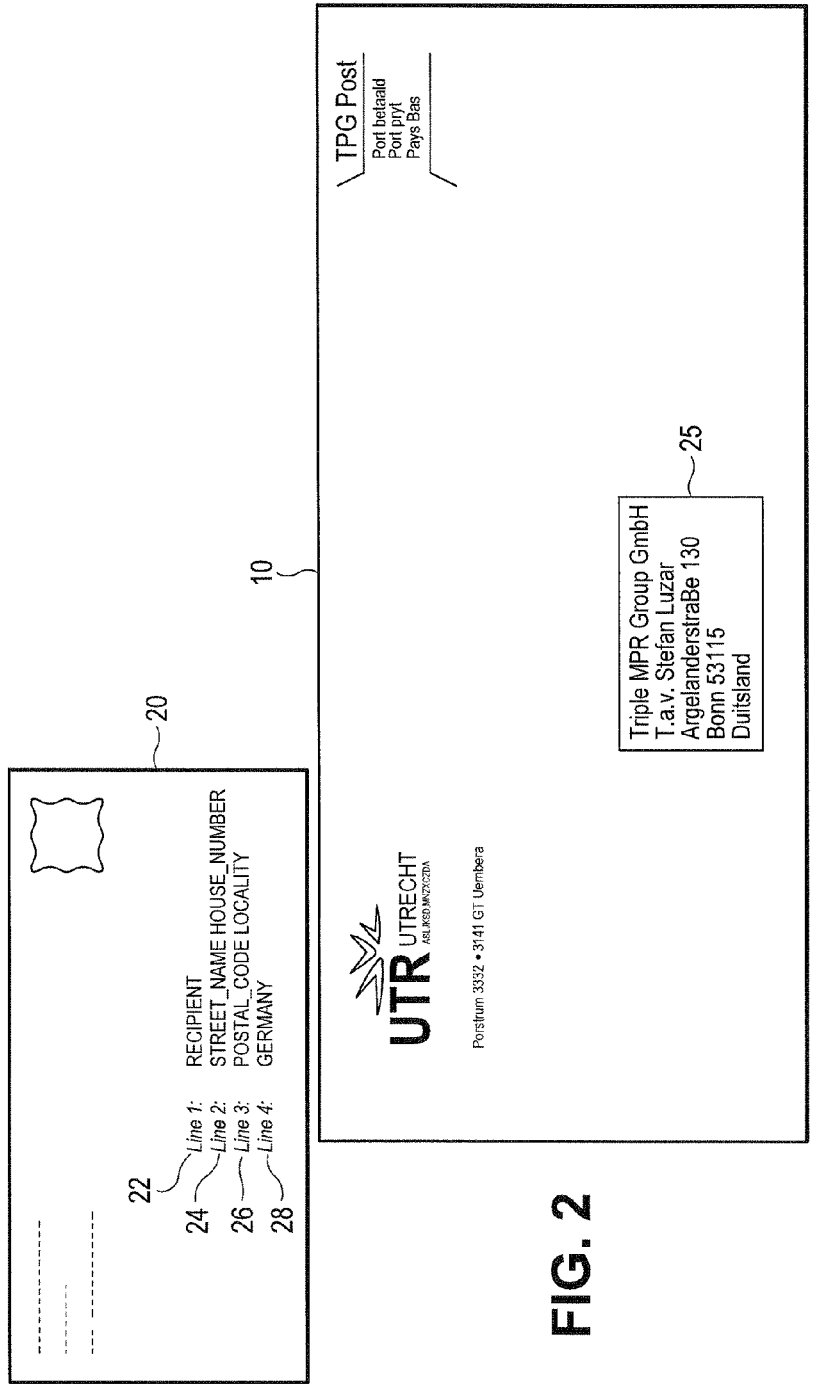
FIG. 2 illustrates a graphical example of an address block and a pattern that might match to it.

FIG. 2 illustrates a graphical example of an address block 25 and a pattern 20 that might match to it. In a mail system, the physical object 10 is a mail piece. It may, however, be such things as a part name and part description as found in the manufacture or maintenance of an airplane, a business card, or almost any object that contains information on it that, when properly interpreted, tells the system what to do with the object based on the definition and use of the patterns discussed below.

A mail piece has on it one or more addresses. For discussion purposes, assume the intent of the system is to determine where that mail piece should be routed, using the destination address printed on the address block 25 of the mail piece. A typical mail piece might contain an addressee, a street number and name, a city, a neighborhood, a sub-neighborhood (barrio in Mexico, for example), and other information. The goal of the mail piece processing is to route the mail piece along a particular set of intermediate destinations (e.g. sorting tables) until it reaches the intended addressee. For details on how the mail piece may be routed, see U.S. patent application Ser. No. 12/711,202, the contents of which are herein incorporated by reference in their entirety.

As previously discussed, there are at least two kinds of information that may be extracted from the object 10, including the object information and the categorizing information. This information may be other than positional. A simple example would be finding a ZIP code by the fact that it matches the NNNNN or the NNNNN-NNNN patterns regardless of where it appears on the mail piece. For non-mail piece objects this categorization information may be arbitrarily complex and, indeed, may require several rounds of parsing, database consulting, and rejection to determine even what this categorization information actually is.

In one example, the object information obtained from a mail piece may contain one or more strings of characters (possibly with alternatives and confidences). The categorizing information may include or identify where those characters appear on the mail piece (e.g. spatial, location, or positional information).

Categorizing information may identify what line the object information is on, and how far from a reference point the object information is located (e.g. the left-hand edge of the address block), etc. This information may be used to enable the parser to determine what to do with the object data (i.e. to determine to what category it belongs). This actual category of this data may not appear explicitly on the object, but be deduced from, for example, positional information on object data obtained by the parser.

The Defined Pattern Set

How and where various address components appears on the mail piece and what those components represent is combined with other elements of the directory system 130 (FIG. 1) to produce a novel object handling system.

Figure 13:
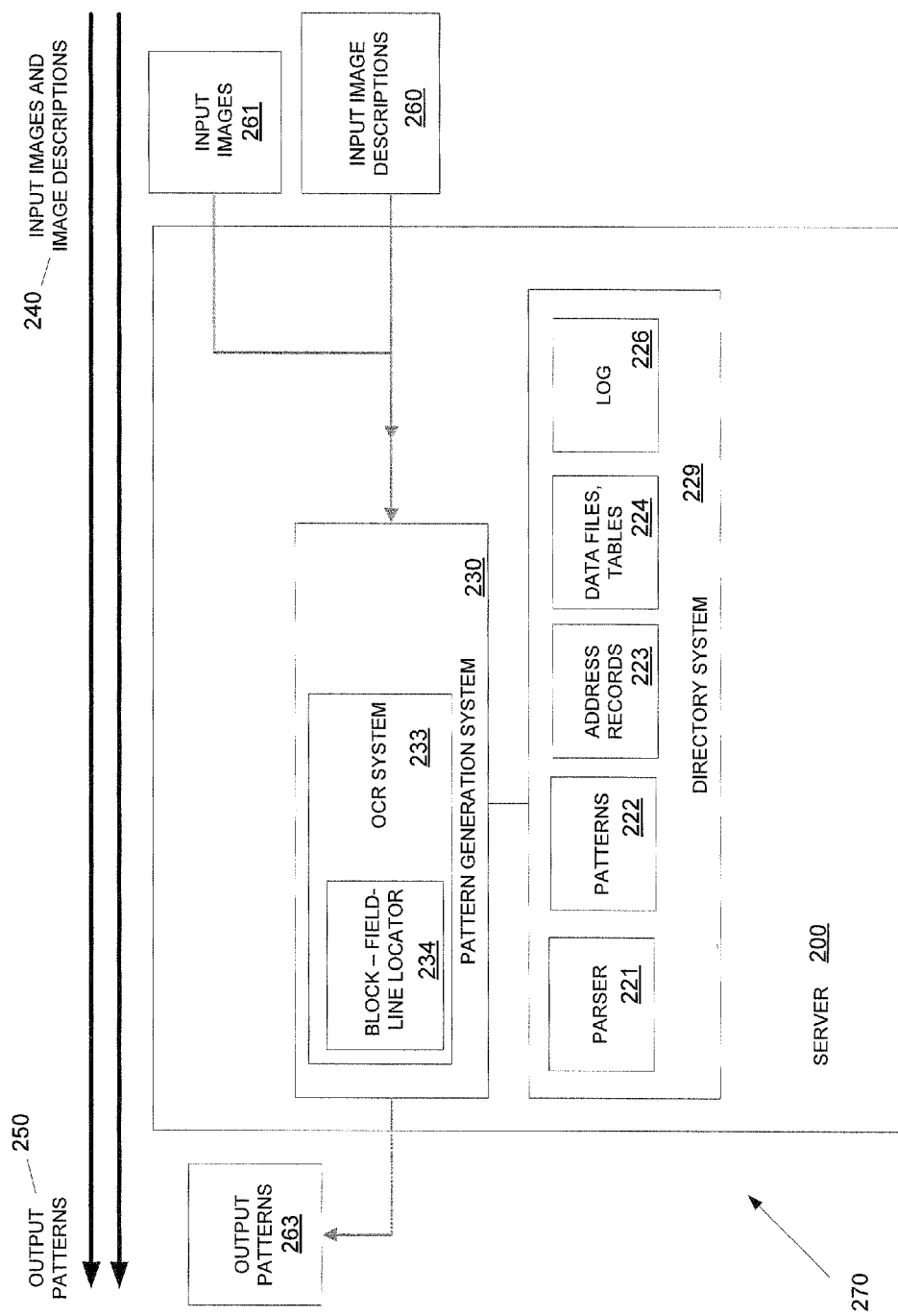
FIG. 13 illustrates an automatic pattern generation system 270.

How and where various address components appears on the mail piece and what those components represent may be combined with other elements of the pattern generation system 270 (as shown in FIG. 13) to produce a further embodiment of a novel object handling system.

A defined pattern may exist in a previously existing form or it may be created by a user for a particular application. As an example of the former case, the Universal Postal Union (UPU) often provides guidance as to where on a mail piece the addressee name, the city name, etc. may appear for various countries. Such definition is almost always descriptive rather than proscriptive and often very approximate. In the latter case, a customer may establish a set of patterns for use in his application. Incoming mail and a country just establishing its addressing standards would be examples of the latter, as would use of the system for handling parts on a Boeing aircraft.

A typical address defined pattern 20 (FIG. 2) might identify:

The top line 22 contains addressee name and may be located just below a 4-state bar code near the middle of the envelope.

The bottom line 28 contains the city name and/or country and, optionally, the government code for the address. The code may be located to the left of the city name and follows the pattern ANANNA, where A is and alphabetic and N a numeric character.

The (third) line 26 above the bottom line may contain the province name and the district name.

There may be additional lines 24 below the Addressee line, for example, which identifies a street name or house number.

The pattern 20 may associate two principle kinds of information: a designator for information type (city name, addressee name, etc.) and categorizing information that allows the parser to determine what kind of object information it has found on the object. An example of categorizing information might be where a ZIP code can be located on a mail piece. Location can be either absolute (say from the leading edge of an envelope) or relative (with reference, say, to the left-hand edge of the address block or to another element on the envelope). The four-digit extension of the ZIP Code may be located to the right of the five-digit ZIP Code in the US. In addition, the pattern 20 may contain information on whether each of the pattern elements must appear or are optional.

Because the system 130 can apply fuzzy matching throughout the parsing process (see below), the matches to names may be inexact or exact, their placement may be inexact or exact, and even a "required" item may be missing and the object handled provided the remaining information allows unique classification via one or more of the patterns.

Often a single defined pattern is not sufficient for a broad set of objects. There are two reasons for this. Consider the case of an address. First, there might be multiple allowed or commonly used address forms, each of which has its own defined pattern. Second, the address on the envelope may be sufficiently incomplete, inaccurate, or ambiguous that it must be approached from several different perspectives before proper confidence in how to handle it can be achieved. Third, user-specific business rules may impose additional constraints or order of precedence that is reflected in the patterns. For example, a user may require that the result of a pattern for which city and province elements match exactly be preferred over the result of a pattern with only a postcode match.

A pattern can provide a description of the expected address and a description of the output that is to be returned with a match on a particular pattern. The output data may be described using meta-tags, constant data, spatial relationships, and constant strings like "Recipient:". Meta-tags in the patterns may be ordered so as to instruct which tag to attempt to match on first. If no match value is found for the higher priority tag values, the system moves on to the next pattern. Meta-tag values also may have qualifiers, like, 'require exact match' or 'allow abbreviation match'. The system can use the ordering of each element in the pattern to predetermine and pre-limit possible candidate values for subsequent data elements.

The output description is associated with a match on the particular pattern, including a result weighting. There may be from one to N patterns used to match on a given set of inputs. These are checked against the input data in an ordered manner until a match is made. The result is weighted (ie. for the confidence in the result) and qualified as a finalization or non-finalization. The output is pulled from the data base row that this pattern matches to so may include any data in that data base row.

There may be a defined order to the patterns to be applied to a particular object, with the intention that some be executed first and others later, perhaps conditionally. A pattern may be set early in the order of processing because it allows a more complete classification of the data from the object, because it is more likely to provide unambiguous results, is more likely to occur, or for many other reasons.

Based on a given object 10 (FIG. 2) such as a mail piece, the directory system may have several predefined patterns that include different sets of categories or different spatial associations with one or more of the categories. A first pattern may be selected that is a preferred format or template, or one that simply includes a more complete address or larger number of categories. The directory system may analyze the image of the object 10 by sequentially comparing the object information with the category information of the selected pattern. If the first object information (or first field) of the object 10 matches the first category information of the selected pattern, than the directory system may proceed to a next object information (or second field) for comparison with the category information.

A successful matching of one or more of the object information may assist the directory system in interpreting or identifying object information in a subsequent field. For example, if a first object information identifies a state of an address, the directory system may utilize the state information to determine which city is included in the address based on a narrowed database search associated with the city(ies) which reside in that state.

Accordingly, analyzing the object information can be instructive in identifying a process associated with a corresponding pattern. Furthermore, the selected pattern can be instructive in identifying or interpreting specific fields of object information that otherwise may not be clear absent correlation with the category information of the pattern both for the field in question and based on the other fields of the object. The order that the fields are examined or processed may be defined in the pattern.

If all, or a sufficient number, of the object information correlates with the category information, then the directory system may determine that the selected pattern provides a good match with the mail piece. The directory system may process the object 10 according to instructions associated with the selected pattern. On the other hand, if the object information does not sufficiently correlate with the category information, the directory system selects a next pattern for comparison.

Confidence in a match made with a specific pattern is also a consideration. There is, not only, a defined order to which patterns are applied to an object, but also, patterns are assigned a confidence level that is reported upon a match. For instance, a match for a mail piece may be attempted with a pattern that requires an exact match on the City, State and Zip code, and if this fails a subsequent pattern may only require a match on the Zip code. A match on the later pattern while instructive may also include a lesser confidence code.

Source code for a sample address pattern is provided as follows:

```
<AddressPatterns name="USA Zip+4 Patterns" ver-
    sion="1.0" xmlns="http://www.raf.com/Smi">
<Pattern name="Street_Zip" levelOfSort="255" is
    Final="true" direction="BottomToTop">
<AddressBlock>
<Line>
<Component searchOrder="3">PrimaryNum</Compo-
    nent>
<NoiseChars maxQuantity="2"/>
<Component searchOrder="4" is Optional="true">Pre
    Dir</Component>
<Component searchOrder="2" minFuzzyMatch
    Level="Low"
    allowTransposed WordMatch="true" allowMatchLast
        WordFirst="true"
    allowMissing MiddleWord="true"
        allowTruncation="true"> Street</Component>
<NoiseChars maxQuantity="2"/>
<Component searchOrder="5" minFuzzyMatch
    Level="Low"
    is Optional="true"> Suffix</Component>
<NoiseChars maxQuantity="2"/>
```

```
<Component  searchOrder="6"  is
    Optional="true">PostDir</Component>
<NoiseChars />
    </Line>
<NoiseLines maxQuantity="1"/>
<Line>
<NoiseChars />
<Component  searchOrder="1"
    requireExactMatch="true">Zip5 </Component>
    <!--
    '-'+Zip4
    -->
<NoiseChars maxQuantity="5"/>
    -<!--
        Delivery point or other post-zip noise (separate dec-
            laration for unit test)
        -->
<NoiseChars maxQuantity="3"/>
    </Line>
<NoiseLines maxQuantity="3"/>
    </AddressBlock>
    <Output>
    <TransportField>Zip5</TransportField>
    <Field>Zip4Low</Field>
    <Field>Zip4High</Field>
    <Field>PrimaryNum</Field>
        </Output>
        </Pattern>
    <Pattern name="PoRrHc_Zip" levelOfSort="255" is
        Final="true">
    <AddressBlock>
    <Line>
    <NoiseChars maxQuantity="2"/>
    <Component searchOrder="2"
        allowAbbreviationMatch="false">PoRrHc</Com-
            ponent>
    <NoiseChars maxQuantity="3"/>
    <Component  searchOrder="3">PrimaryNum</Com-
        ponent>
    <NoiseChars />
        </Line>
    <NoiseLines maxQuantity="1"/>
    <Line>
    <NoiseChars l>
    <Component  searchOrder="1"  require
        ExactMatch="true">Zip5</Component>
        <!--
            '-'+Zip4+DP
            -->
    <NoiseChars maxQuantity="7"/>
        </Line>
    <NoiseLines maxQuantity="3"/>
        </AddressBlock>
    -<Output>
    <TransportField>Zip5</TransportField>
    <Field>Zip4Low</Field>
    <Field>Zip4High</Field>
    <Field>PrimaryNum</Field>
        </Output>
        </Pattern>
    <Pattern name="Street_CS_Exact" levelOfSort="250"
        is Final="true" maxNumRecords="0">
    <AddressBlock>
    <Line>
    <Component  searchOrder="7">PrimaryNum</Com-
        ponent>
    <NoiseChars maxQuantity="2"/>

<Component  searchOrder="5"  is
    Optional="true">PreDir</Component>
<Component  searchOrder="3"  requireExact
    Match="true">Street</Component>
<NoiseChars maxQuantity="2"/>
<Component  searchOrder="4"  minFuzzy
    MatchLevel="Low"
    is Optional="true">Suffix</Component>
<NoiseChars maxQuantity="2"/>
<Component searchOrder="6" is Optional="true">
    PostDir</Component>
<NoiseChars />
    </Line>
    <NoiseLines maxQuantity="1"/>
    <Line>
    <NoiseChars maxQuantity="2"/>
    <Component  searchOrder="2"  requireExact
        Match="true">City</Component>
<Component  searchOrder="1"  readRight
    ToLeft="true">State</Component>
<NoiseChars />
    </Line>
<NoiseLines maxQuantity="3"/>
    </AddressBlock>
<Output>
<TransportField>Zip5</TransportField>
<Field>Zip4Low</Field>
<Field>Zip4High</Field>
<Field>PrimaryNum</Field>
    </Output>
    </Pattern>
<Pattern name="Street_CS" levelOfSort="250" is
    Final="true" maxNumRecords="0">
<AddressBlock>
<Line>
<Component  searchOrder="7">PrimaryNum</Com-
    ponent>
<NoiseChars maxQuantity="2"/>
<Component searchOrder="5" is Optional="true">
    PreDir</Component>
<Component  searchOrder="3"  allow
    LeadingAttachedNoiseMatch="false"
    allowTrailingAttachedNoiseMatch="false"
        allowTransposedWordMatch="true"
    allowMatchLastWordFirst="true"
    allowMissingMiddieWord="true"
    allowTruncation="true">Street</Component>
<NoiseChars maxQuantity="2"/>
<Component  searchOrder="4"  minFuzzy
    MatchLevel="Low"
    is Optional="true">Suffix</Component>
<NoiseChars maxQuantity="2"/>
<Component searchOrder="6" is Optional="true">
    PostDir</Component>
<NoiseChars />
    </Line>
<NoiseLines maxQuantity="1"/>
<Line>
<NoiseChars maxQuantity="2"/>
<Component  searchOrder="2"  allowLeading
    AttachedNoiseMatch="false"
    allowTrailingAttachedNoiseMatch="false"
    allowTruncation="true">City</Component>
<Component  searchOrder="1"  readRight
    ToLeft="true">State</Component>
<NoiseChars />
    </Line>
```

```xml
<NoiseLines maxQuantity="3"/>
</AddressBlock>
<Output>
<TransportField>Zip5</TransportField>
<Field>Zip4Low</Field>
<Field>Zip4High</Field>
<Field>PrimaryNum</Field>
</Output>
</Pattern>
<Pattern name="PoRrHc_CS" levelOfSort="250" is
    Final="true" maxNumRecords="0">
<AddressBlock>
<Line>
<NoiseChars maxQuantity="2"/>
<Component searchOrder="3"
    allowAbbreviationMatch="false">PoRrHc</Component>
<NoiseChars maxQuantity="3"/>
<Component searchOrder="4">PrimaryNum</Component>
<NoiseChars />
</Line>
<NoiseLines maxQuantity="1"/>
<Line>
<NoiseChars maxQuantity="2"/>
<Component searchOrder="2" allowLeading
    AttachedNoiseMatch="false"
    allowTrailing AttachedNoiseMatch="false">City</Component>
<Component searchOrder="1" readRight
    ToLeft="true">State</Component>
<NoiseChars />
</Line>
<NoiseLines maxQuantity="3"/>
</AddressBlock>
<Output>
<TransportField>Zip5</TransportField>
<Field>Zip4Low</Field>
<Field>Zip4High</Field>
<Field>PrimaryNum</Field>
</Output>
</Pattern>
<Pattern name="CSZ_Only" levelOfSort="10" is
    Final="false" maxNumRecords="0">
<AddressBlock>
<Line>
<NoiseChars />
<Component searchOrder="3"
    allowTruncation="true">City</Component>
<NoiseChars maxQuantity="2"/>
<Component searchOrder="2" readRight
    ToLeft="true">State</Component>
<NoiseChars maxQuantity="2"/>
<Component searchOrder="1" requireExact
    Match="true">Zip5</Component>
<NoiseChars />
</Line>
<NoiseLines />
-<!--
    Extra NoiseLines element for unit test
-->
<NoiseLines />
</AddressBlock>
<Output>
<TransportField>Zip5</TransportField>
</Output>
<Pattern>
<AddressPatterns>
```

The Database

Figure 3:
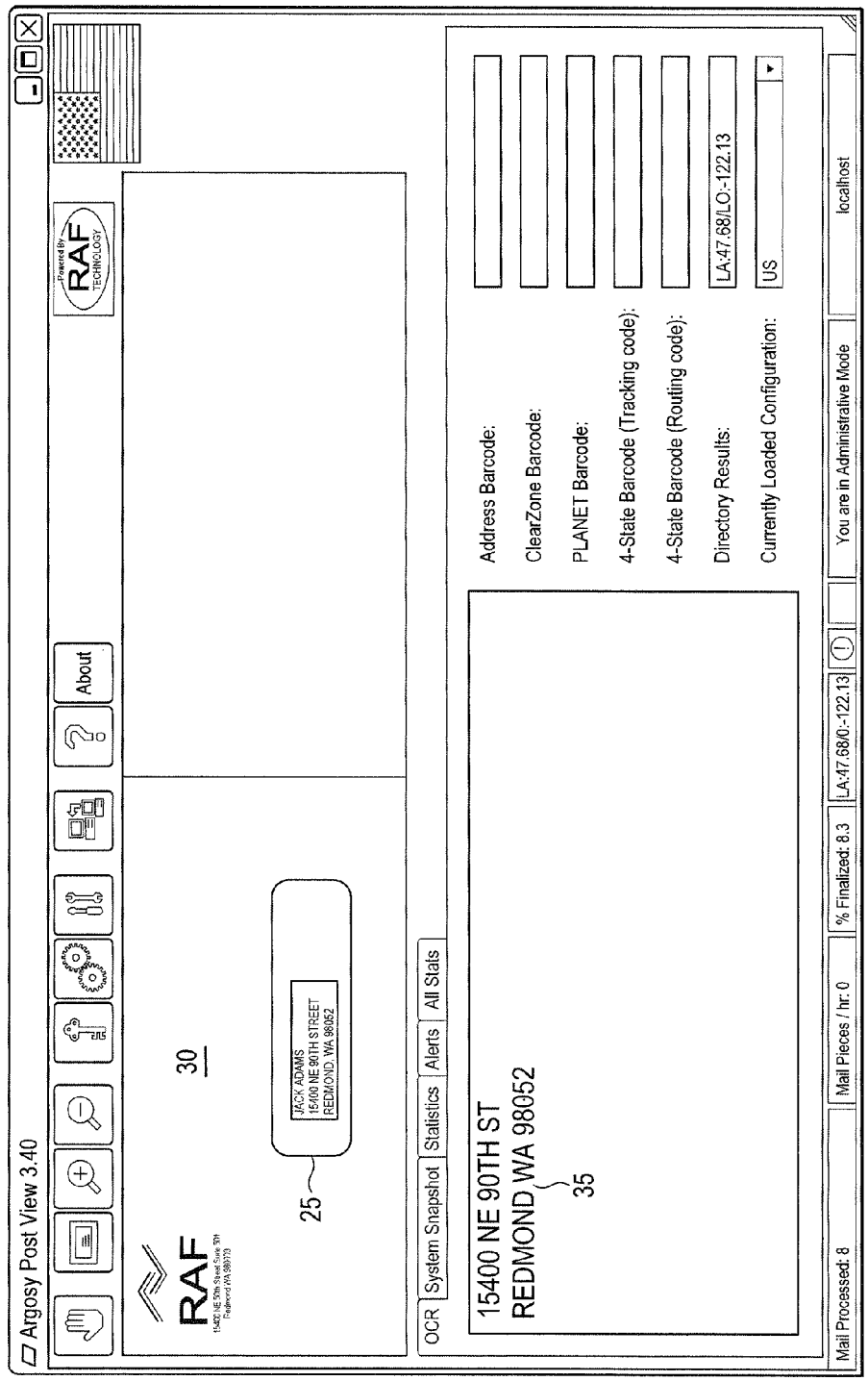
FIG. 3 illustrates a screen shot of a mail processing system's visual display. This display shows an image of a mail piece which has undergone optical character recognition, with the result then sent to the directory system, returning recognized and matched and verified address.

FIG. 3 illustrates a screen shot of a mail processing system's visual display. This display shows an image of a mail piece 30 which has undergone optical character recognition, with the result then sent to the directory system 125 (FIG. 1), returning recognized and matched and verified address 35. The mail piece 30 has undergone optical character recognition (OCR), directory lookup in the directory system and returned result 35. The image of the mail piece 30 includes an address block 25. The address block data identified from the OCR may be displayed as one or more fields of object data 35 corresponding to which category information is being analyzed. The object data 35 corresponds to the object information as matched with or identified using a corresponding pattern or patterns in the database(s).

There are at least two kinds of information in the database: specific instances of the components of defined patterns and instructions on what to do with the object when an instance of a defined pattern is found. The components of the defined patterns are listed in the database in such a way that the parser can tell which defined pattern(s) they apply to. This linkage may be as direct as database elements that assign the components to a particular pattern or patterns (pattern numbers or names, for example) or it may be implied by the database structure. A column may be headed by a header "Province Name", for example, with specific province names repeated for all the cities in the province, neighborhoods in the cities, etc. (which appear in subsequent columns), and any pattern requiring that information about an address would use the data in those columns.

Entries (typically rows) in the database may relate to one or more defined patterns. That is, the parser may use the same set of database entries to attempt to match more than one pattern. This is particularly true when two patterns differ only by an optional item. For example, if the "Neighborhood" is an optional address element, one pattern may direct the parser to look for it in a particular place on the mail piece while another ignores the neighborhood and looks for a city name in the same location on the object. The parser would in this circumstance use the same database row to try to match the data from the object to the two different patterns, and would follow the instructions associated with that row once a match was found.

A typical simple example of a mail piece database would have one row for each delivery point in the country. The row might contain all the elements that would be present were the address complete and in this case the entire database would be applicable to all patterns. A more complex database might have regions of the database applicable to specific patterns and not applicable to others. The database would then have an indicator, useable by the parser, of which part of the database to use for a particular pattern. Different patterns may be associated with different databases and different pattern sets may use apply to a single database.

The database may contain additional information to improve the parser's ability to match text strings contained in the object information. Non-standard abbreviations, transliterations, aliases, and numeric transformations (e.g. "1" to "ONE" or "SIETE" to "VII") specific to the pattern domain may be included. Word translation lists may be defined for multilingual applications. Mappings may be specified between characters with accent marks or non-Latin characters and their typographic or OCR equivalent. For example, the user may want to treat 'ñ' and 'n' as equivalent, or 'ü' and 'ue' as equivalent.

The database allows the parser to determine whether the address block object data 25 found on the object matches one of the defined patterns. The parser/database combination may allow matching of more than one pattern and a module for resolving the ambiguity. For example, a neighborhood and a city might have the same name (in Mexico, for example, it is quite possible to have a delivery point for which the district, city, and neighborhood all have the same name, only some of which appear on the mail piece).

If there are different routing instructions if the pattern matches that duplicated name to the city or if it matches it to the neighborhood, the parser may attempt to match both patterns and, getting a match to both, pass the results to a module that resolves the ambiguity by only routing the item to the deepest place in the sort that matches both patterns (in this case, the city level). The database may also be configured to automatically provide such decisions by putting the routing code for the city level of sort as the routing instructions for every city/neighborhood pairing that is duplicated.

Once a match to a defined pattern has been made, the database provides instructions on what to do with the object. For a mail piece, the database might include and return a bar code to be sprayed or printed on the mail piece. Typically, each row in the database is unique and each one has one set of instructions to be implemented. In many cases the instructions may be the same for many database rows. For example, a country that automatically sorts only to neighborhood level and leaves it up to the courier to determine the final delivery may provide a database that contains street names and numbers but provides the same routing instructions for all streets and number ranges within a particular neighborhood. Multiple matches may be returned.

The instructions provided by the database may be code numbers that the rest of the system (e.g. the mail sorting system) knows how to interpret to properly handle the object. The instructions in the directory system may include a tracking code for a matched object, Latitude and Longitude coordinates (FIG. 11) that may be used to further qualify a destination address, or instructions in plain text to a user on what to do with the object.

The Parser

Figure 4:
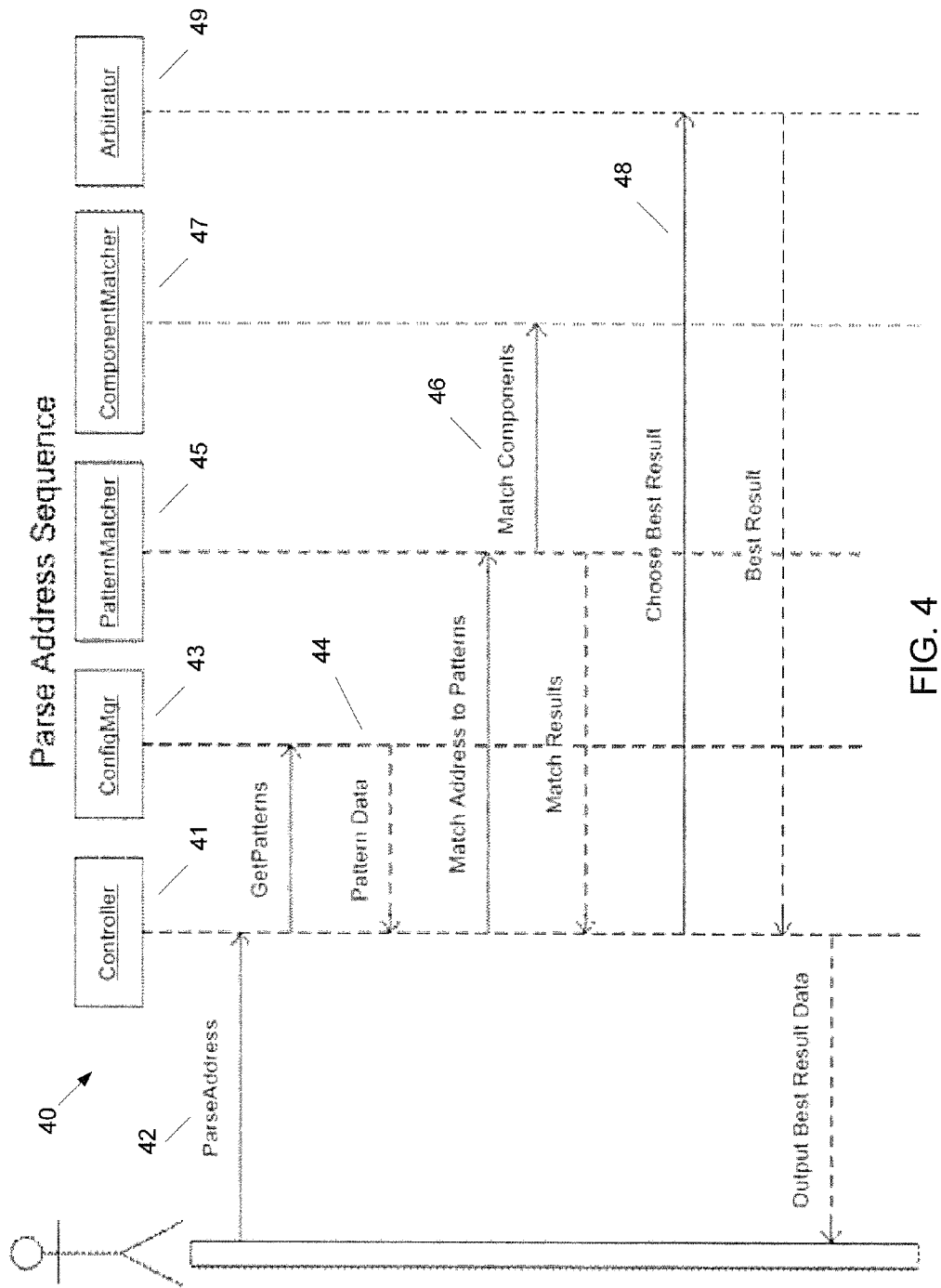
FIG. 4 illustrates the sequence used when the directory system parses an object, in this case a "ParseAddress".

FIG. 4 illustrates the sequence used when the directory system parses an object, in this case a "ParseAddress. For sake of clarity, the various functions of the parser 40 are described linearly, however it should be understood that one or more of the functions may be performed in a different sequence or omitted altogether. Furthermore, it should be understood that this is a highly reentrant system, capable of using information deduced in one part of the process to clarify information obtained in another.

The parser 40 is illustrated as comprising several components, including a controller 41, configuration manager 43, pattern matcher 45, component matcher 47, and arbitrator 49. The parser 40 combines the other three components—the data from the object, the defined patterns, and the database elements—and passes on to the rest of the system the instructions for handling the object. A primary purpose of the parser is to handle all the inaccuracies and errors that occur in the real world. Thus, in every step of what is described below as the functioning of the parser, it should be understood that the parser may be correcting errors in the object data or in the database and providing leeway in determining how well the data from the object matches a given defined pattern.

The parser may supply to the rest of the system not only handling instructions, but how confident it is that those instructions are correct. The uncertainty measurement by the parser may be used by the system (whether for a single information element or for the entire data extracted from the object) to modify the handling of the object, to request a new image from the object, to try a different pattern, to call for manual intervention, or to otherwise modify the handling of the object.

The parser receives object data 42 from the object, which data is intended by the system to provide information sufficient for determining how to handle the object, and which in turn identifies categorizing information. In a mail piece, the object data comprises a string of character data that might comprise an address element, whereas the category data comprises the X-Y coordinates of each of those characters. Stated another way, the object data provides the directory system with raw data while the category data provides information that allows the parser to determine what kind of information the raw data contains.

The parser has access to the defined patterns and instructions 44 on how to apply them. These instructions 44 may be to apply them sequentially until a match above a certain confidence is found, to apply them until all possible matches are found, or almost anything else. In particular, the instructions 44 may tell the order in which to apply the patterns (and under what circumstances to cease applying them) for determining handling instructions for a given object.

The parser also has access to the database and uses the information in the database to attempt to fill in the defined patterns with information extracted from the object. It can fulfill this function in many ways, but the following describes one possible application to a mail piece. The parser has received categorizing information as well as object data from the object. It uses this categorizing information 46 to determine what pattern data element a piece of object data might represent. Thus a five digit number on a mail piece may be a ZIP code if it appears in the last line, but a street number if it appears in the second.

One goal of the parser is to fill in all the required elements of a defined pattern with data extracted from the object whose characterizing information is within the tolerances specified by the defined pattern. It fills in the elements by determining from the characterizing information which data elements the object data might be and determining from the database what specific data element in an actual address (or object data row) is matched, and how well.

If the parser is able to satisfactorily fill in a defined pattern with database objects of the proper type using object and characterizing information from the object, it reads the instructions 48 in the database on what to do with the object and makes that information available to the system. If it is unable to do so (or if its instructions tell it to keep working until all possible patterns are exhausted), it goes on to the next pattern and continues until no patterns remain. If it finds no satisfactory match it has default instructions that it outputs telling the system that no defined pattern was matched satisfactorily.

Smart Matching

Figure 5:
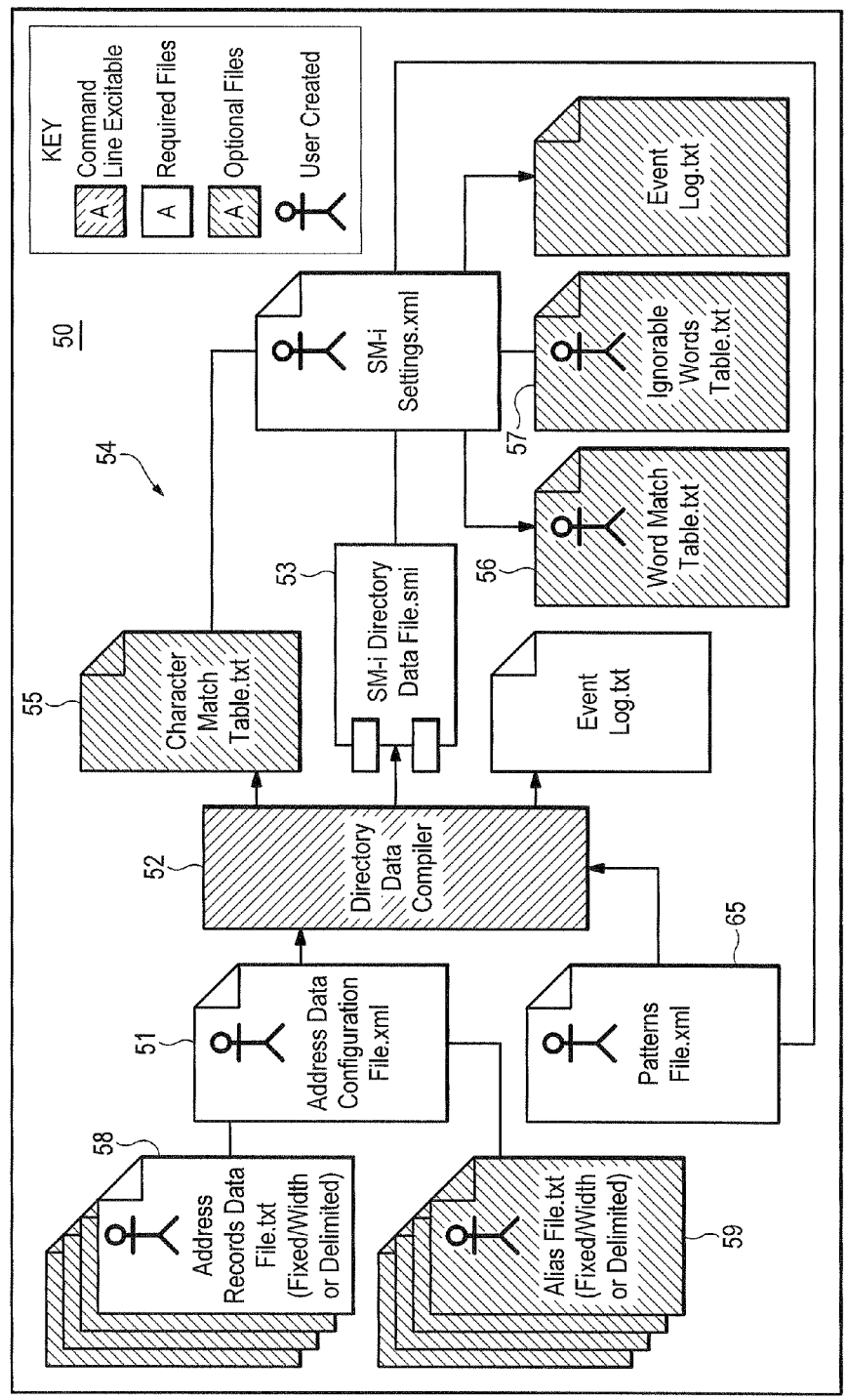
FIG. 5 illustrates the overall system including both the front-end directory data compiler and a back-end runtime pattern identification and categorization data files.

FIG. 5 illustrates the overall data and data flow for a directory system 50 including both a front-end directory data compiler 52, its associated input files and tables, 51, 65, 59, 58, and a back-end runtime pattern identification and the back-end pattern identification and categorization processing inputs 54. On the left side, the directory data compiler inputs 52 are what the user puts together in order to create the setup for the directory system to run, and the right side illustrates the input files 54 that are used when the directory system is being run.

The directory data compiler 52 is provided to ensure that the configuration files 51 are well-formed. The directory data compiler system 52 validates two aspects of the configuration files 51: structure and data content. The configuration file 51 is said to be structurally invalid if, for example, it contains improper elements or is missing a closing tag. The configuration file 51 is said to have invalid data content if element or attribute data does not match the type specified in the schema. For example, a positive integer value is expected for searchOrder; a content error would result if the attribute had the string value "bunny."

Note that some kinds of logic errors may not be readily detected. For example, an address pattern 65 may have used a component name that does not match a corresponding address data field name. Additional checking may be performed by the directory system (FIG. 1) 125 at run-time to notify the user of such errors.

Runtime character matching allows for the specification of the name of the file that contains mappings to allow the directory system to match common character alternates. For example, 'Ö' could exist in the directory data 53, but it will likely be recognized using OCR without the umlaut, so the mapping 'Ö'→'O' can be made to improve fuzzy matching performance. In one embodiment, only one CharacterMatchTable 55 element is allowed. The character match table file 55 may include a UTF-8 encoded text file, with one mapping per line. A mapping is declared with the character found in the directory data 53 on the left, followed by a dash-greater than style arrow sign ("→"), followed by the mapped character. The dash-greater than style arrow sign is also illustrated herein as a simple right-directional arrow for convenience.

More than one mapping may be declared for the same directory data character, with each character appearing on a separate line. For example:
Ö→O
Ö→8

Note that the character match table 55 may be case-sensitive. Therefore character mappings that are meant to apply to non case-sensitive fields have upper case values on both sides of the "→"

Word matching allows for the specification of the name of the file that contains mappings to allow the directory system to match common word alternates. For example, "MOUNT" could exist in the directory data 53 as part of a field value, but it is commonly abbreviated as "MT", so the mapping "MOUNT"→"MT" should be made to improve fuzzy matching performance. In one embodiment, only one <WordMatchTable> element is allowed.

The word match table file 56 may be a UTF-8 encoded text file, with one mapping per line. A mapping is declared with the word found in the directory data 53 on the left, followed by a dash-greater than style arrow sign ("→"), followed by the mapped word. More than one mapping may be declared for the same directory data word, with each character appearing on a separate line. For example:
MOUNT→MT
MOUNT→MNT Word match table entries can also be used for numeric input and directory data words. For example:
20TH→TWENTIETH
TWENTY→20

An ignorable word option specifies the name of the file that contains words such as articles and prepositions which the directory system can ignore in the input string or directory string while fuzzy matching. For example, if the ignorable words table contains "OF" and "THE", then the input string "AVENUE AMERICAS" will fuzzy match the directory string "AVENUE OF THE AMERICAS". Similarly, the input string "AVENUE OF THE AMERICAS" will fuzzy match the directory string "AVENUE AMERICAS". A small penalty may be applied to the match score for each ignored word so that a better score is achieved if the ignorable words are present and matched. In one embodiment, ignorable words must match exactly; "THF" would not be ignorable if the table only contained "THE".

The ignorable words table 57 file may be a UTF-8 encoded text file with one ignorable word per line. Leading and trailing whitespace may be trimmed. In one embodiment whitespace is not allowed within the word.

Customer address data 51 consists of address records 58 and alias tables 59. Customer address data 51 can be imported into the directory system from a text file that contains either delimited or fixed-width fields. An XML configuration file is used to define the fields to be loaded along with properties of those fields, and specify the locations of the fields in the data file. Whether fixed-width or delimited, a customer address data file 51 is expected to have one record per line, with a line feed character ('\n') at the end of each line.

A customer address data configuration file 51, which contains at least one address file definition and may contain one or more optional alias file definitions, is used by the directory data compiler 52 to create the directory data file 53. Note that the example uses only delimited address and alias files, but both delimited and fixed width files can be mixed in the same configuration.

For fields that are not case-sensitive, values (including aliases) are converted to all upper case. If an upper case equivalent does not exist for a character then it is not modified. For example:
"Redmond Woodinville"→"REDMOND WOODINVILLE"
"90th"→"90TH"

Character match, word match, and ignorable words may be provided in one or more tables. In one embodiment, character match, word match, and ignorable words are not converted and are always case-sensitive. Therefore values that are meant to apply to non case-sensitive fields are given in upper case.

Field aliases can be defined to improve address pattern matching. An alias is an alternate but equivalent representation of data for a specific field value. For example, "Calif" and "California" are sometimes used as aliases for the preferred, canonical two-letter state code "CA". If either "Calif" or "California" is found in an address block it may be considered a match to a record that contains the canonical field value "CA". Each alias table is tied to a specific field. So while "Montana" may be an alias for the state field value "MT", it is not an alias for the word "MT" in the street field value "MT SHASTA".

Consider the following sample of a delimited table of two-letter state code aliases. An alias may consist of a single value or a list of values. For example, there might be multiple aliases for a city name. If a list of values is used then a delimiter may be supplied to correctly parse the list.
// Common state aliases
// Canonical=Alias
AK=ALASKA
AL=ALABAMA,ALA
AR=ARKANSAS,ARK
AZ=ARIZONA,ARIZ
CA=CALIFORNIA,CAL,CALIF CO=COLORADO,COL,COLO
CT=CONNECTICUT,CONN
DC=DISTRICT OF COLUMBIA,WASH DC,WASHDC, DIST COL
DE=DELAWARE, DELA, DEL
. . .

The directory system 125 (FIG. 1) reads addresses by comparing a block of character strings or recognition results to a set of one or more customer-defined address patterns 65. The address pattern 65 describes where different components of an address, such as street name and postcode, can be found relative to one another, and relative to the address block containing them. In addition, the address pattern 65 defines areas where ignorable text ("noise" which is not an important part of the address) may be found.

Figure 6:
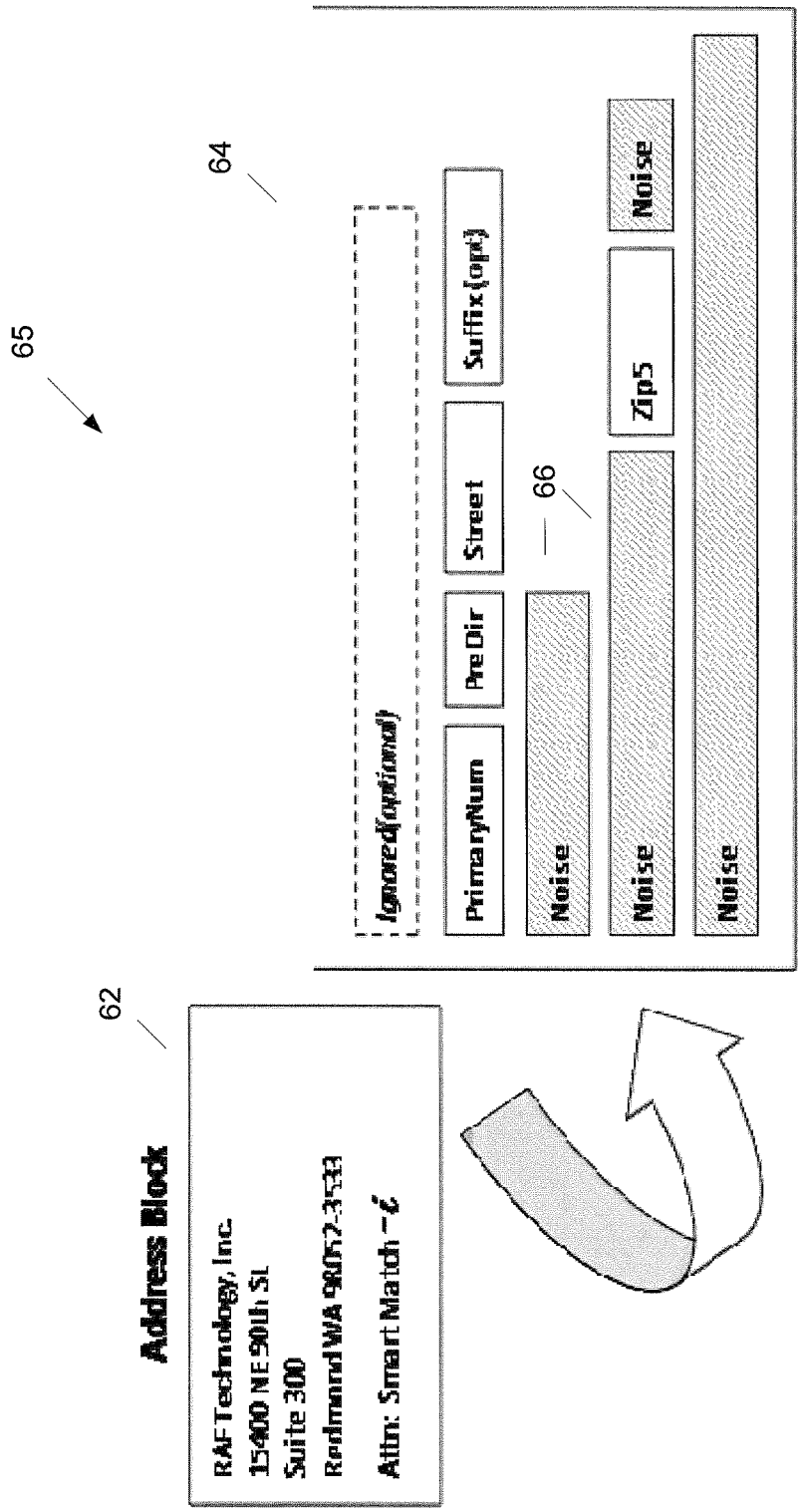
FIG. 6 graphically represents an example pattern comprising an address block and field descriptors.

FIG. 6 graphically represents an example pattern 64 comprising an address block 62. The example pattern 64 may be used to describe the address block 62 using field descriptors 64. In this pattern 64, city, state, and suite number are treated as noise 66. In another application it might be preferable to identify these components in the pattern rather than ignore them. The firm line is ignored in this case with or without a noise declaration because this pattern 64 is searched from bottom to top and the firm line is above the topmost line that contains required components.

An input address block may contain additional information, such as telephone number or addressee name, mixed with required component data. To improve pattern matching performance with this extra data, noise character placeholders can be declared in the pattern. Up to maxQuantity characters in the input address block can be ignored between two matching components if a <NoiseChars> element exists in the pattern between the two <Component> elements. To declare that one or more entire lines of the input address block could be ignored as noise a <NoiseLines> element should be used.

<NoiseChars> and <NoiseLines> may contain element text making it "named noise". This text indicates that the content of this specified noise area should be written as output using the given element text as the name. Specification of named noise adds the following restrictions to the noise elements:

No consecutive <NoiseChars> or <NoiseLines> where 1 of the elements is named
No <NoiseChars> or <NoiseLines> with only optional components between them (including all optional lines)
No completely optional lines with a named <NoiseChars> element Patterns may be configured using an XML file. The Pattern file 65 (FIG. 5) contains one or more patterns, each identified by a customer-defined name. The directory system attempts to match each pattern in the order in which it appears in the file. In one embodiment, a pattern 64 defines a single configuration of an address block 62 and the fields 64 that will be returned to the caller for each address record that successfully matches the pattern 64.

A line represents a single line of an address as it appears on a piece of mail. In one embodiment, a line must contain at least one component, and can also contain noise. The position of each <Line> element in the AddressBlock 62 is important since the pattern matcher utilizes the same relative positions in the input data.

A component is a piece of an address, such as postcode or street name, which is represented by a field in the directory data. <Component> elements are defined for a line in the same order in which they are expected to appear in the input data.

The pattern matcher can determine in what order it should search the input data for matching component values. Some components are considered optional and an address record will not be rejected if it has a component value that was not found in the input. For example, if street suffix is optional, then the input "MAIN" will match the record "MAIN ST". Given two records that are identical except one has a matching optional component and the other does not, the one with the matching optional component is preferred. For example, given the input "MAIN ST", the record "MAIN ST" is preferred over "MAIN RD" and simply "MAIN" if street suffix is optional.

The component matcher can scan each line from right to left looking for the component instead of left to right. This can improve matching performance for components that are typically found on the right side of the line, such as postcode.

Each character in the directory data string must be represented by a character in each possibility set of the text or OCR string. If all values for the field have one word and the same number of characters, the matcher is able to handle a limited number of split/merge cases (i.e. directory data string is split into two or is merged with another string in the input). A single missing, leading zero digit is allowed for fields that are all numeric. For example, the directory data string "08010" matches the input string "8010".

A fuzzy logic matching confidence threshold can be set for the component. String fuzzy matching is used to compare the input to field values from the directory. Allowed settings are: "VeryLow", "Low", "Default", "High", and "VeryHigh". A better match may be required for "High" than for "Low". For example, the directory string "WOODINVILLE" would not match the input string "WODNVALLE" with a setting of "VeryHigh", but it would match with a setting of "VeryLow" or "Low".

The pattern matcher may match directory words to input abbreviations. For example, with this feature enabled the directory string "Johann Sebastian Bach" would match the input "J Sebastian Bach" or "J S Bach". At least one word must be unabbreviated, so "J S B" would not be an acceptable match. [Optional, default=true]

The pattern matcher may match directory words to an input acronym, or vice versa. For example, with this feature enabled the directory string "Salt Lake City" would match the input "SLC". Similarly, the directory string "MLK" would match the input "Martin Luther King". Ignorable words may be dropped from the directory string, so the directory string "United States of America" would match the input "USA" if "of" is in the ignorable words table.

The pattern matcher may match directory words that include contractions of articles and prepositions to an expanded equivalent form in the input. For example, with this feature enabled the directory string "Comte d'Urgell" would match the input "Comte de Urgell". In addition, the input would be matched if the article or preposition is missing, as in "Comte Urgell".

The pattern matcher may trim leading noise glyphs from an input word in order to match a directory word. For example, with this feature enabled the directory string "Dallas" would match the input "lllDallas". A substring match of a numeric part of a string is not allowed. So while the directory string "82nd Avenue" would match the input string "A82nd Avenue", it would not match the input string "182nd Avenue".

The pattern matcher may match the last directory word to the first input word, and then match the remaining words in the proper order. For example, with this feature enabled the directory string "San Gerolamo Emiliani" matches the input "Emiliani San Gerolamo".

The pattern matcher may allow a match with the first directory word missing from the input. For example, with this feature enabled the directory string "Giuseppe Verdi" matches the input "Verdi". This option can be combined with allowMissingMiddleWord, allowMissingNonNumericLastWord, and allowMissingNumericLastWord, however no more than one word can be missing from a string.

The pattern matcher may allow a match with any single word from the directory string to be missing from the input except the first or last word. For example, with this feature enabled the directory string "Don Luigi Milani" matches the input "Don Milani", however "Don Luigi Alberto Milani" does not. This option can be combined with allowMissingFirstWord, allowMissingNonNumericLastWord, and allowMissingNumericLastWord, however no more than one word can be missing from a string. Note that a word that is in the ignorable words table may not count as missing in this context.

The pattern matcher may allow a match with the last directory word missing from the input provided the word does not contain any digits. For example, with this feature enabled the directory string "Cernusco sul 0" matches the input "Cernusco" (assuming "sul" is an ignorable word); however "State Route 20" does not match "State Route" unless allowMissingNumericLastWord is also enabled. This option can be combined with allowMissingFirstWord, allowMissingMiddleWord, and allowMissingNumericLastWord, however no more than one word can be missing from a string.

The pattern matcher may allow a match with the last directory word missing from the input provided the word contains digits or is a Roman number. For example, with this feature enabled the directory string "Vittorio Emmanuele II" matches the input "Vittorio Emmanuele"; however "Martin Luther King" does not match "Martin Luther" unless allowMissingLastWord is also enabled. This option can be combined with allowMissingFirstWord, allowMissingMiddleWord, and allowMissingNonNumericLastWord, however no more than one word can be missing from a string.

The pattern matcher may trim the numeric ordinal, i.e. "st", "nd", "rd", or "th", from a directory word prior to matching the input word. For example, with this feature enabled the directory string "29th Ave" would match the input "29 Ave". To avoid false-positives, ordinal trimming is not attempted with directory words that have a single-digit numeric portion, so the directory string "5th Pl" would not match "5 Pl".

The pattern matcher may match a Roman number to a numeric string. For example, with this feature enabled the directory word "XXIII" matches the input "23" and the directory word "23" matches the input "XXIII". An exact match may be required.

The pattern matcher may trim trailing noise glyphs from an input word in order to match a directory word. For example, with this feature enabled the directory string "Elm Street" would match the input "Elm StreetIII". A substring match of a numeric part of a string is not allowed. So while the directory string "Highway 52" would match the input string "Highway 52A", it would not match the input string "Highway 521".

The pattern matcher may match strings with pairs of words transposed. For example, with this feature enabled the directory string "Redmond Woodinville Road" would match the input "Woodinville Redmond Road". Each word may only be affected by a single transposition. So the directory string "Redmond Woodinville Road" would not match "Woodinville Road Redmond" because two transpositions would be necessary: "Redmond"/"Woodinville" followed by "Redmond"/"Road".

The pattern matcher may match an input word with a truncated directory word. For example, with this feature enabled the directory string "Philadelphia" would match the input string "Phila". Where truncation is only allowed on the right-hand side, "Philadelphia" would not match "Delphia".

Figure 7:
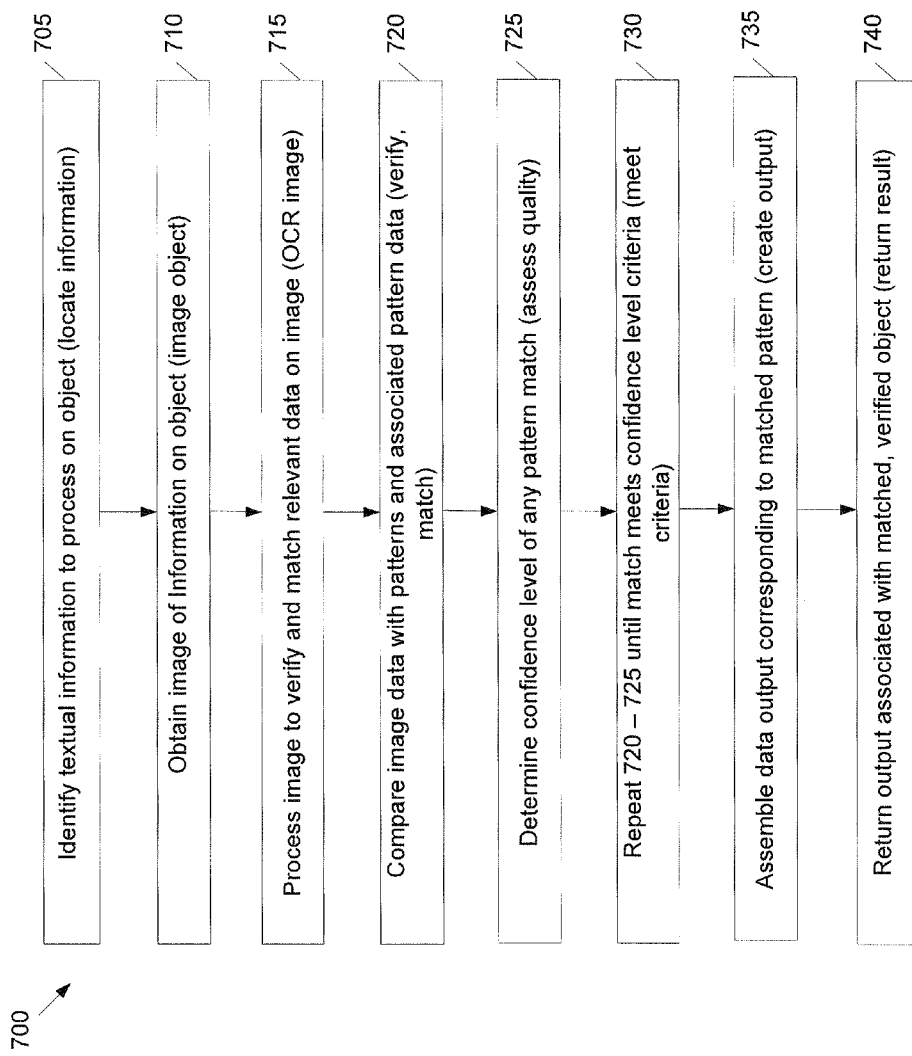
FIG. 7 illustrates a process of identifying, imagining, matching, verifying classifying and delivering the results of an object match.

FIG. 7 illustrates a process 700 of identifying, imaging, matching, verifying classifying and delivering the results of an object match. For example, an object such as the image of a label of address may be processed. At operation 705, an object or mail piece is loaded into the directory system. In one embodiment, a large number of mail pieces are loaded into the directory system at the same time for sequential or parallel evaluation of the mail pieces.

At operation 710, an image of the object is obtained. The image may be obtained with a camera, scanning device (e.g. charge coupled device CCD or contact image sensor CIS), optical sensor, thermal imaging device, magnetic imaging device, etc. In one embodiment, images of the objects are uploaded to the directory system in bulk. For example, the objects being identified, sorted, delivered, or classified may have been previously scanned or photographed ahead of time.

At operation 715, the image of the object is processed with a recognition system, such as a system which utilizes OCR. The recognition system may parse the image into separate lines of characters or words that may be analyzed for context and/or meaning. The recognition system may identify an address block of the image, which specifies an intended destination of the object or mail piece.

At operation 720, the parsed image data is compared with a first pattern. For example, a first line of the address block is compared with a first field or component of the first pattern. Similarly, a second line of the address block may be compared with a second field of the first pattern. In one embodiment, a single line of the address block may be associated with, or compared to, a plurality of fields in the pattern. Operationally this matching may be performed top down or bottom up.

The patterns may be weighted. The weightings may determine an order for comparison of the patterns with the image data. For example, the first pattern to be compared to the image data may have a higher weighting than a second pattern to be compared to the image data.

At operation 725, a confidence level of the comparison of the image data with the first pattern is determined. A confidence threshold may be associated with the first pattern. In one embodiment, the first pattern is validated, or considered a match, when the confidence level equals or exceeds the confidence threshold for the first pattern.

If the confidence level is less than the confidence threshold associated with the first pattern, the directory system may then compare the image data with the second pattern according to the assigned weighting of the patterns. A confidence level of the comparison of the image data with the second pattern may then be determined. The remaining patterns may be cycled through until a confidence threshold of a corresponding pattern is met or exceeded.

At operation 730, a pattern is selected or validated for the image data. In one embodiment, a single pattern is selected for the image data. For example, as soon as the confidence threshold for the corresponding pattern has been met or exceeded, the directory system stops cycling through the plurality of patterns and selects the corresponding pattern.

At operation 735, a pattern output is identified for the selected pattern. The pattern output may identify a standard or canonical format corresponding to the address block. In one embodiment, the canonical format provides additional information that was not included in the address block. The canonical format may also replace one or more words in the address block with a more standardized version, or corrected spelling. The canonical format may also remove redundant or unnecessary information that was identified in the address block. In one embodiment, the output does not include any of the same information that is included in the address block, but rather points to related information in a database such as geo coordinates, a telephone number, or a bar code.

At operation 740, the canonical format is sprayed on, printed on, or otherwise applied to the object or mail piece. In one embodiment, the canonical format information is transferred to the object via a short-range signal such as RFID. In that case, the object may include a memory chip which is configured to store the canonical format information. The canonical format information may then be used for further sorting, delivery, classification, or inventory of the object.

Figure 8:
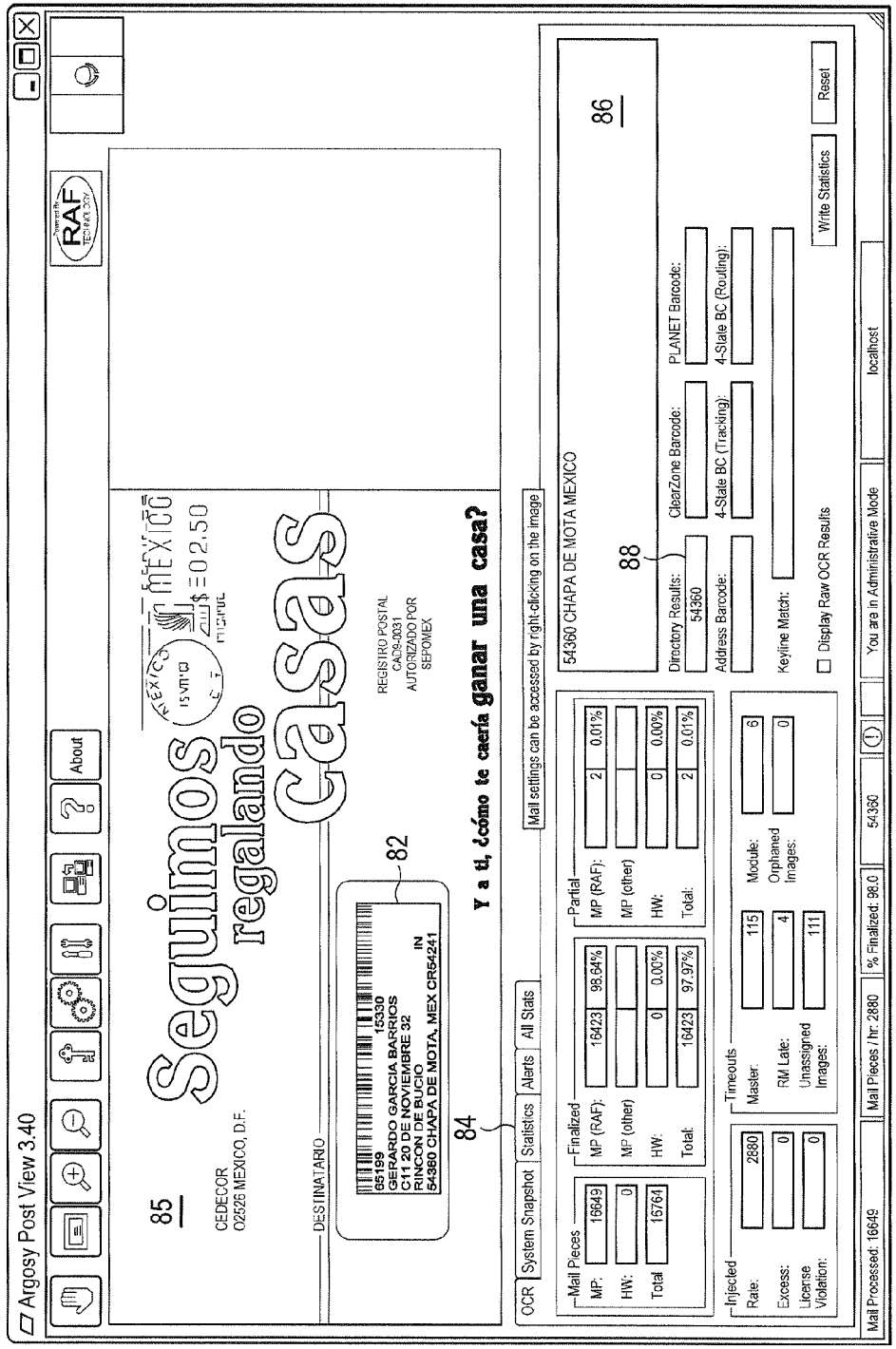
FIG. 8 is an example screen shot of the mail processing system's visual display. It illustrates the use of the directory system to return standardized output (86 and 88) based on matching and verifying an address.

FIG. 8 is an example screen shot of the mail processing system's visual display. It illustrates the use of the directory system to return standardized output (86 and 88) based on matching and verifying an address (82). Based on location or pattern matching as described above, an address block 82 is identified from the image 85. The address block 82 may include the destination of a mail piece, or an identification of an object being inventoried, for example.

The directory system includes multiple selection tabs 84 that include optical character recognition (OCR), system snapshot, statistics, alerts, and all statistics. In the present screen shot illustrating the all statistics selection tab 84, a mail sort job is summarized as including 16649 mail pieces, of which those that have been processed include 16423 with finalized pattern matches, and two with partial pattern matches.

The right side of the screen shot includes a directory result identification 88 which identifies that a pattern match has been made which identifies the image as corresponding to directory result 54360. A partial or complete identification of the directory result 54360 is provided in the address result box 86. In the example provided, the information shown in the address result box 86 matches, or nearly matches, the last line of the address block 82. The abbreviation for Mexico is provided as MEX in the address block 82, whereas it is fully identified as "Mexico" in the address result box 86.

Database Optimization

The directory system may be used in applications such as high-speed mail sorting where response time is critical. The directory system is also designed to accommodate user data consisting of an arbitrary collection of fields, so database optimization must be able to automatically adapt to the data and patterns related to a specific application.

The directory system optimizes database access at compile time, when user data is normalized, analyzed, and loaded into a binary file format, and at initialization time, when software using the directory system is started. At compile time the directory system performs adaptive indexing to improve database query speed. By analyzing the data, patterns, and user configuration, the directory system determines which fields should be indexed to balance performance with database size. Indexes can significantly increase the database size, so it is not practical to create indexes for all combinations of fields. For example, consider a data set consisting of US addresses. The following pattern could be defined to match a complete address:

State→City→Street→House Number→Suffix→Pre-directional→Post-directional (fields are shown in search order)

An index is created for state since the pattern matcher will need the list of city values associated with the parsed state. Similarly, a two-field index for state-city is created because the pattern matcher will retrieve a list of streets associated with the previously parsed state-city combination. A three-field index, state-city-street, is also created, but since the number of records associated with a specific state-city-street combination is relatively small this will be the last index created for this pattern. At this point entire records would be fetched instead of values for a single field.

At initialization the directory system analyzes the patterns and preemptively caches data that will be queried frequently or may be too expensive to access at parse-time. Given the US address pattern described above, for example, the directory system knows to query the database to generate a static list of all state values to be used by the pattern matcher. The directory system then analyzes the size of the list of state values. If the list is not too long, the directory system queries the database to create a static, associative table of city values for each state value. These static data structures can be orders of magnitude faster to access and manipulate compared the same operations with a SQL query.

EXAMPLES

A Specific Address Use Case may include a single data base and a set of patterns to correlate a result with context information. Iceland mail is formatted as follows.

"Person" or "Firm Name"
"Street Name" "House Number"
"Postcode "City Name"
"Country"

For routing in smaller cities you typically need "Postcode" and "City Name" (cities with only one Postcode) and for larger cities you need "Street Name" and sometimes "House Number" (where a street could be in multiple nine digit postcode areas), "Postcode" and/or "City Name". In either case, the return is a nine digit "Post code". Addresses only have three digit "Postcodes". For Example, when considering this Icelandic address:

Lára Borg Ásmundsdóttir
Laugateigi 20
105 REYKJAVÍK

This routes to 10500250000 if you route it with postcode, city, and street name. However if you specify a route based only on "Postcode" and "City", this address may not be verifiable because it is a "Large" city where street and house number may be required by the Directory. However, when considering this one:

Flugþjónustan Keflavíkf
V.HEITI: IGS-REST
KEFLAVÍKURFLUGVÖLLUR
235 KEFLAVÍKURFLUGVÖLL This address will finalize and route by "Postcode" and "City" because it's from a smaller city and this routes to 235000000.

Figure 9:
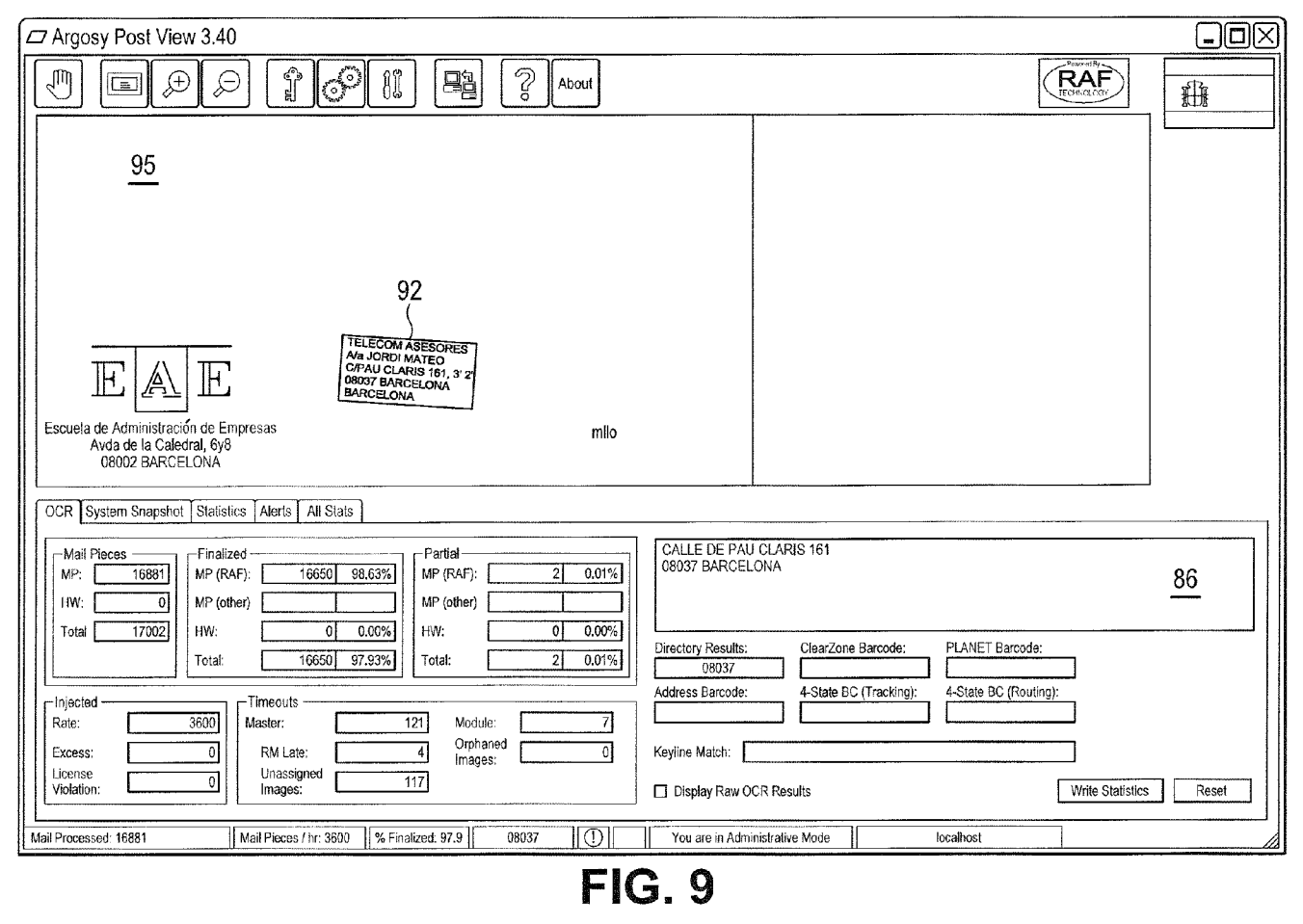

FIG. 9 illustrates the mail processing system using the directory system's fuzzy logic to return verified and matched information (86) associated with an image of an address (92). In this example, the address block includes a third line of text as "C/ PAU CLARIS 161, 3$_o$ 2'''" and a fourth line of text as "08037 BARCELONA".

The third line of text may be understood to be a short-hand or abbreviated form of the street address that may not be identical with a directory entry. The directory system may initially query the directory to locate partial matches to one or more of the words "PAU" or "CLARIS" or that include the number "161".

The zip code and country (e.g. 080307 BARCELONA) on the other hand, may provide an exact match in the directory. Upon finding one or more matches with the street address, the directory system may then compare those records with valid street addresses that are associated with the validated zip code and country. In the directory result box 86 of the example provided, the directory system has validated "CALLE DE PAU CLARIS 161" as being associated with the third line in the address block.

Validation of the street address may be accomplished by comparing stored street addresses for the validated zip code and country, and by verifying a confidence level of the match of the scanned street address with the stored street addresses. In one embodiment, the zip code and country is validated before searching for the street address match to further narrow the number of initial directory results prior to performing the fuzzy logic match.

Canonical Address Translation

Figure 10:
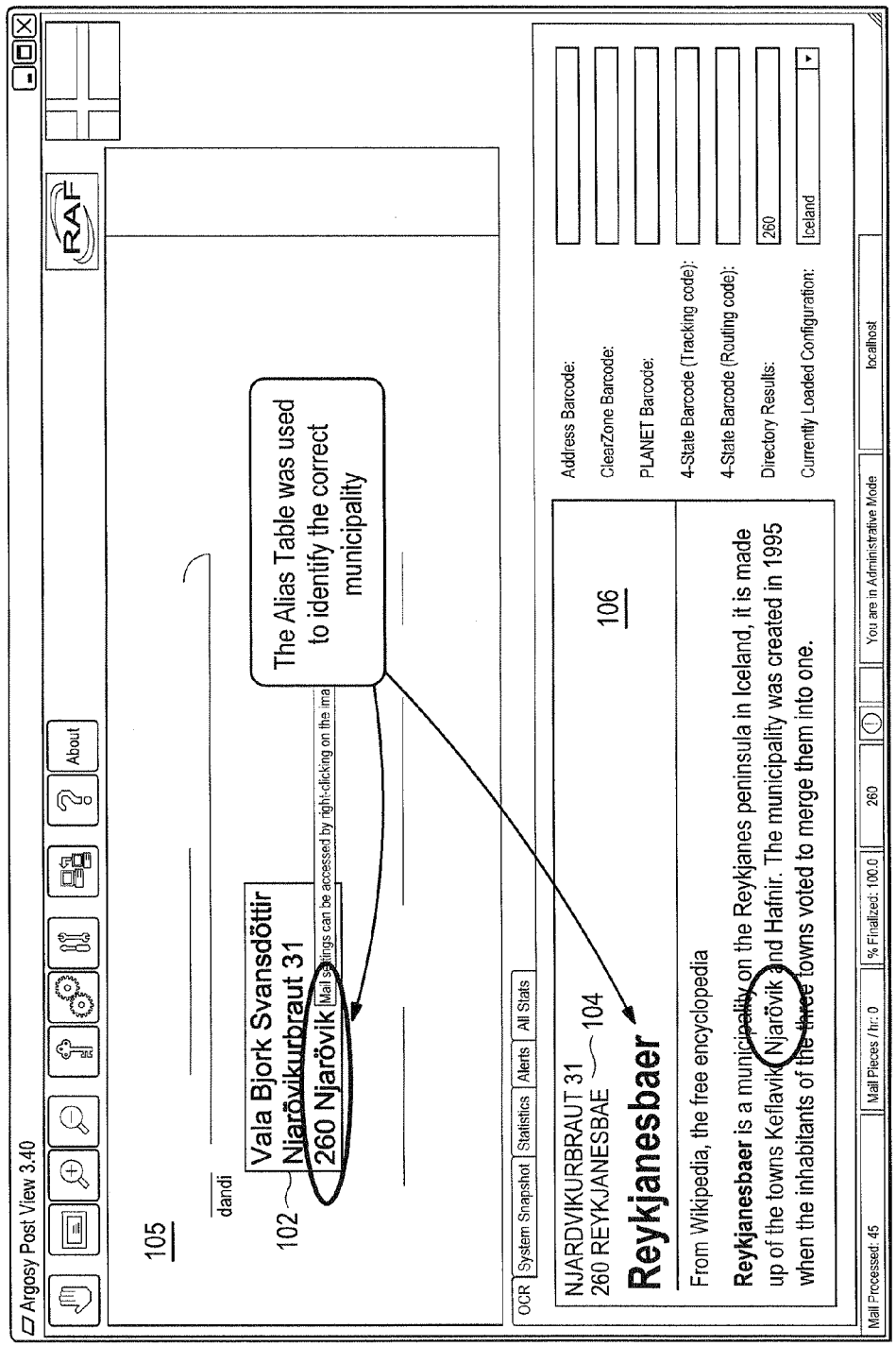
FIG. 10 is an example screen shot of the mail processing system's visual display. It illustrates the use of the directory system's aliasing capabilities to associate and match to an alias with information identified on an image of an address.

FIG. 10 is an example screen shot of the mail processing system's visual display. It illustrates the use of the directory system's aliasing capabilities to associate and match to an alias with information identified on an image of an address (102). The third line of the address block 102 of the image data appears as "260 Njarð vík". In an example embodiment, the directory may not include an exact match with this older name of the town that has since been renamed as Reykjanesbaer. In other words, "260 Njarð vík" may no longer be a valid address. However, by including an alias table, old or local versions of the names of towns may be associated with the standardized or canonical version of the address so that the mail piece may nevertheless be properly identified, sorted, delivered, or classified.

In the illustrated example, the relationship between the proper name and the aliases of the names may be stored or referenced via shared information on the Internet as provided in OCR box 106. Upon identifying the standardized version of the town's name, the directory system may then revise the address of the mail piece to replace the older or local version of the name of the town in order to generate the canonical address 104.

This same concept may be utilized, for example, for sorting and delivery of international mail pieces. In additional to historical reasons where the names of cities may be different from one another, names of cities and countries may be spelled quite differently simply as a result of the various languages involved. An alias table which identifies all of the different variations for the various languages can thereby associate the variations with a canonical version of the name. For example, the canonical version of the name of a country may be the version that is native to the country in question, whereby all other deviations of that name that are typically used in other countries are associated as aliases. In another embodiment, the canonical version of all the names are those associated with the versions adopted by a particular accepted language, such as French.

In the European Union, a name of a city or country may be spelled quite differently depending on the language of choice. By way of example, The Netherlands is commonly referred to by a number of different names including Holland and Les Pays-Bas, to name a few. By associating these names with a canonical version of the address, whether a letter addressed to Amsterdam originated in France or in the U.K. a standardized address or label may be sprayed, printed, or otherwise applied to the letter which would identify the same canonical name for the destination country. By extension, a single canonical address can be applied for all of the different variations that exist either by convention or due to differences in languages.

By way of a further example, a mail piece from the United States comes into China, written in English. It is written to correspond to one of several possible Chinese address templates where the components are all in English. The canonical output format, however, is not in English at all, but in Chinese. The directory system templates and translation to canonical address formats can be used to automatically translate the address from one language (and is associated templates) to another language, including the canonical template for that country. In operation, a sequence of English-language templates are applied to the mail piece and once the template components are filled in, the address code for delivery is extracted from the database. The delivery code may then be sprayed, printed, or otherwise applied to the mail piece for routing using bar code readers.

A format translation database derives a delivery code by applying templates which point to the canonical form of the address. The process may work for part of an address or the entire address. For example, the mail piece may identify a city but not a state. The template can identify a unique city without any reference to the state, and output both the city name and the state as the official format for application on the mail piece. Similarly, the directory system can identify the canonical address written in a different language from that identified on the mail piece as originally received.

Figure 11:
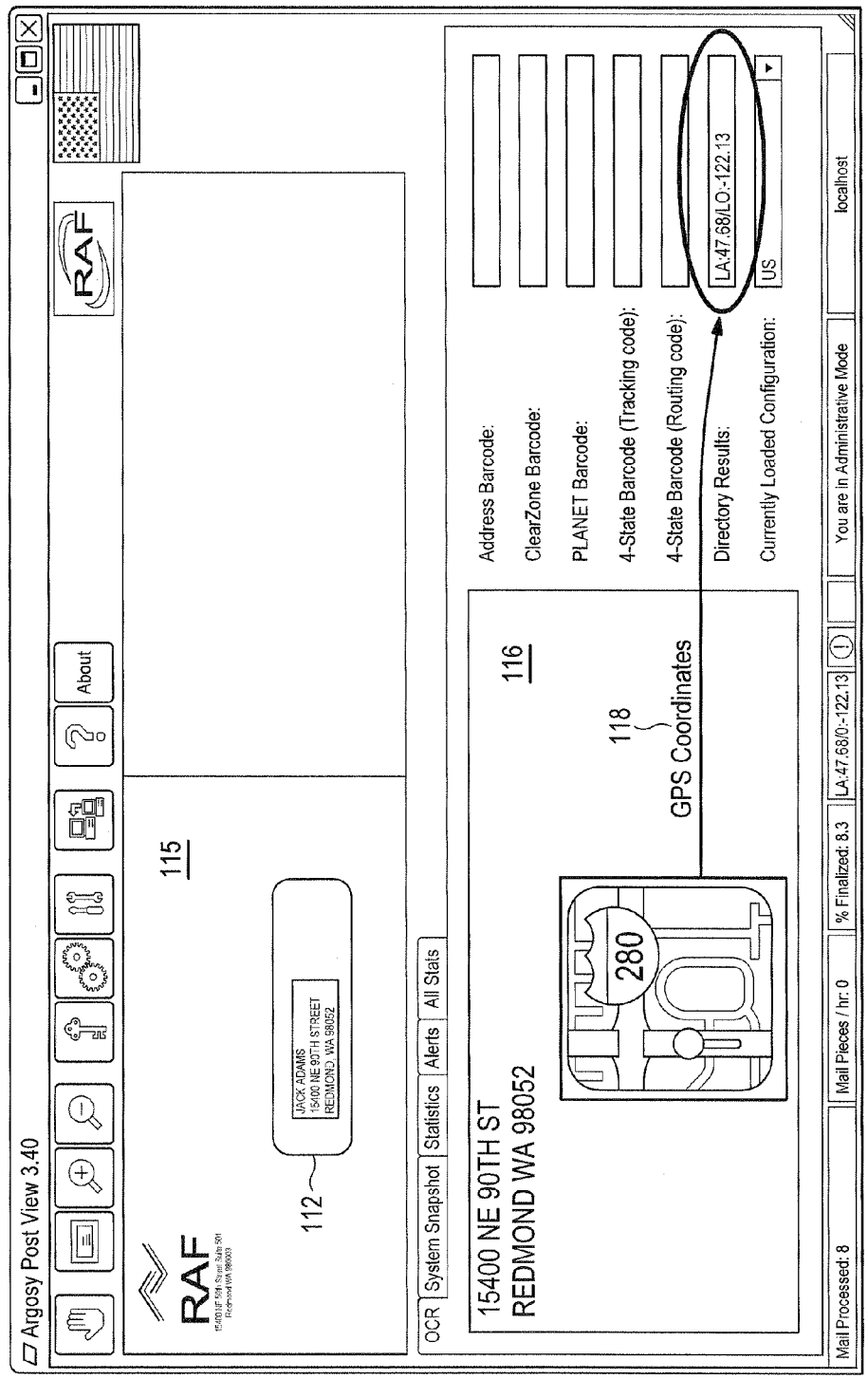
FIG. 11 is an example screen shot of the mail processing system's visual display. It illustrates the identification of geopositional data related to the data matched on the image from a scanned address.

FIG. 11 is an example screen shot of the mail processing system's visual display. It illustrates the identification of geopositional data 118 related to the data matched on the image from a scanned address 112, 113. In the illustrated example, the GPS coordinates 118 corresponding to the address in the address block 112 are displayed in the OCR box 116. In addition to the GPS coordinates 118 a visual map of the destination address may be displayed. The GPS coordinates 118 may be displayed with the canonical address 114 that is associated with the image data obtained from the address block 112. In addition to geo positional or GPS coordinates, other information associated with the destination or the person/people located there, such a phone number, may be displayed or otherwise matched to the image data 115.

Handwriting Recognition

A handwriting engine is highly reliant on contextual information in order to properly read text. Contextual information allows the engine to be able to resolve ambiguous words by being able to apply a dictionary of possible words to a written word. The directory system may be used as the contextual system for a handwriting engine. The directory system allows the user to create a parsable structure for text and an associated dictionary for each of the fields in that block of text. For example, a US address block contains different fields that need to be read (city name, ZIP code, street name, etc.) and those text fields are in a small set of possible locations. As another example, a personal check has a set of fields that are to be read (date, amount, recipient, etc.) with those fields in a specific set of locations.

Handwriting applications would normally be written for a specific usage scenario without the ability to easily reuse the handwriting engine in a new situation. With the directory system a handwriting engine can easily be used in new situations by changing the configuration and/or changing the data dictionary. Effectively, this makes the handwriting engine the parser described above, using the patterns and the database to read the handwritten text.

A configuration is created that specifies the set of possible layouts of text elements that are to be read by the handwriting engine. Each text element in the configuration is associated with a data dictionary. The dictionary for each element may be dependent on previous elements (for example, list of streets in a particular city). The dictionary may also be a regular expression (for example, a date field on a check). The handwriting engine reads the configuration.

Given an input image containing handwritten text, the engine iterates through the words in the text block and while reading, determines which of the set of configured layouts this input text best matches. As it reads each input text element, it uses the dictionary for that element in a given text layout to determine how well that layout matches the input text block.

Automatic Pattern Generation

Figure 12:
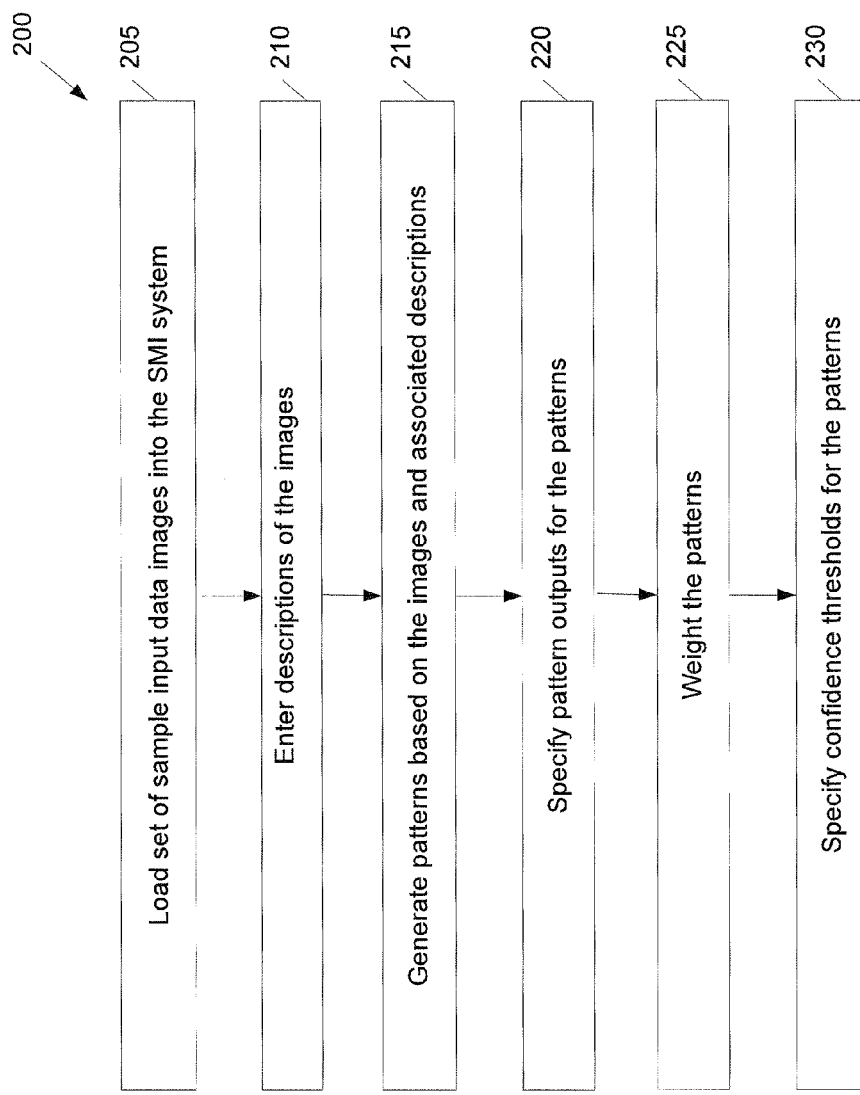
FIG. 12 illustrates an example process of automatically generating patterns from a number of sample objects.

FIG. 12 illustrates an example process of automatically generating patterns from a number of sample objects. At operation 205, a set of sample input data images are loaded into the directory system. For example, the sample input data images can be similar to those illustrated in one or more of FIGS. 2, 3, and 8-11. The images can be loaded as digital images, or the images can be obtained from a sample set of physical objects, which may be scanned using an camera device.

Each input data image will contain input data corresponding to the Input Image Description in a specific defined area of interest. The area of interest is meant to represent a standard area of interest that may be encountered in the processing of like input data images.

At operation 210, descriptions of the images are entered or loaded to the directory system. The descriptions may, but is not required to, identify a location of specific fields or components to provide a set of spatial identifiers. For example, one location of an address block may be described as "country", whereas another location of the address block may be described as "street address". Different patterns are associated with a different set of descriptions or spatial identifiers.

The sample input data identifies the pattern name that is associated with a specific input image, the priority and/or confidence level of this pattern, the pattern field element names, the corresponding data found in each pattern field element on the image area and in the area of interest, and the specific outputs that should be associated with a match on a given image pattern.

At operation 215, a number of patterns are generated based on the images and associated descriptions. A different pattern may be generated for each image and image description combination. The patterns correlate the image data with the associated description and optional spatial identifiers. The patterns may be associated with one or more aliases for certain of the address fields or components.

For example, the customer creates N images, where each image shows a single representative example of a typical image to be processed including an example of a typical data format with data in the typical locations. When the set of N images are taken together they represent the entire collection of data formats that the customer system processes using the patterns to be created. These N images have specific data on them. This data would be identified in an accompanying text image data description file. The data description file includes the image name, the data that should be found on that image and the 'meta-tag' that this specific data item is associated with. For instance if the image says: "Blackwood, NJ" on it, for this image the image data description file might specify:
<City>Blackwood</City>
<State>NJ</State>

The Data Description file may also specify the pattern outputs, pattern weighting and other characters of each data item specified. At operation 220, pattern outputs are specified for each of the patterns. The pattern output may identify what information will be sprayed, printed, or otherwise applied to the mail piece if the associated pattern provides a match. In one embodiment, the pattern output identifies a canonical address.

At operation 225, the patterns are weighted. For example, a first pattern may be weighted higher than a second pattern. The pattern weighting may indicate a preferred or standard format for the addresses. In one embodiment, the pattern weighting relates to a confidence level in how complete the information associated with the pattern is. For example, a pattern which identifies both city and state may have a higher weighting, or confidence, than a pattern which only identifies the city.

At operation 230, confidence thresholds are specified for the patterns. The confidence threshold may identify to what degree the image data of the scanned mail piece must match a particular pattern before a match is determined or verified. If the confidence threshold for a pattern is not met, then the directory system moves on to the next lower weighted pattern to determine if a match with the next pattern can be met. In one embodiment, the directory system stops comparing the image data with the patterns once the confidence threshold for a corresponding pattern is met. In this way, the highest weighted pattern which is validated for the mail piece is selected as a match, or as a best match with the image data. Different patterns may have different confidence thresholds.

This system takes the loaded information and generates a plurality or deck of patterns based on the set of sample input data images and the sample input data image descriptions described above. This includes generating a single pattern based on each image and its corresponding description and specifying a confidence matching threshold for each pattern. The specified confidence threshold identifies to what extent image data must match a particular pattern before a match is verified and declared, the spatial relations of the pattern field elements, and the generic canonical and/or custom output to be associated with a match on this pattern.

FIG. 13 illustrates an automatic pattern generation system 270. No one has to actually deduce the patterns by hand. The system 270 provides the ability to extract the patterns automatically from such a labeled and described set of images, whether the patterns are simple or complex.

The automatic pattern generation system 270 enables a customer to start with a set of sample input data images 261 and the description 260 of what's on each of these images, using the system to combine these to generate the patterns that could be used to match other images that have the same format as the sample input images. A one-time data file/pattern file generation process may be followed by a runtime phase where the system and the data file and patterns are used to recognize input and generate specified outputs.

The automatic pattern generation system 270 functionality auto-generates address patterns based on a set of customer supplied images of representative addresses 261 and a customer supplied corresponding image description file 260 that describes what is on each image. The pattern auto-generation process may be run once (or a limited number of times), using the customer supplied images 261 and image description files 260 to generate patterns 263 that will subsequently be used as input to the patented system as it processes images of this type.

Consider the following address block retrieved or scanned from a input image 261 mail piece:
SAINT ANDREWS CONVENT
8 BERGEN COURT APARTMENT 2A
BAYONNE NJ 07002

A corresponding Image data description data 260 for the above address might include the following source code:

<Component value=796">PrimaryNumber</Component>
<Component value= BERGEN> StreetName</Component>
<Component value=07002>Zip</Component>
<Component value=BAYONNE>City</Component>
<Component value=NJ>State</Component>
<Component value=COURT>Suffix</Component>
<Component value=2A>SecondaryNumber</Component>
<Component value= APARTMENT>SecondaryName</Component>
<Component value=SAINT ANDREWS CONVENT>RecipientName</Component>

When a specific set of images and a specific set of image data descriptions are run through the automatic pattern generation system 270, the resulting pattern file may be used to aid in optimizing a data file specific to these reading these types of images and also used in recognizing other images containing similar data patterns. In one embodiment, the user can specify the patterns to be evaluated, the confidence associated with each pattern, and the corresponding outputs for the selected patterns.

A physical object is provided with enough information on it to allow the system 270 to determine and perform a desired function. For a mail system this may be an envelope with some attempt at or approximation to an address on the envelope. For a manufacturing plant or parts depot, this may be a label or serial number which identifies a part or otherwise associates information with the part. The system 270 is configured to extract the information from the object (object information) and then determine information about that information that is extracted from the object (categorizing information). For a mail piece, this additional component may comprise an address block locator 234 and an OCR system 233

A defined pattern or set of patterns may exist a priori (e.g. a Universal Postal Union-defined address format for each country), or it may be defined for a specific application by a vendor or by a customer. This will be described in detail below. Part of the defined pattern may include information on how to apply the pattern either alone or in a defined and prioritized order with other defined patterns, and what generic and specific information to return.

The database contains the lists of classification elements, individual applicable element values and the desired system output when a desired pattern has been matched. For a mail application this database may contain, for example, a list (the list being a classification element) of states (the states being individual applicable element values), the cities within each state, the neighborhoods within each city, and the carrier routes within each neighborhood. The desired output may be the routing ZIP code. The database hierarchy corresponds to the classifying elements to be found on the object and to the patterns created for classifying the object.

The parser determines which input data fields on the object correspond to which elements in the defined patterns and to which elements and element values in the database. The parser is smart enough to do fuzzy matching on the input data fields and to interpolate missing elements where possible.

The relationship between the defined pattern and the elements in the database may be viewed as similar to that between a defined class in, say, C++ and the many possible instantiations of that class. The pattern or patterns show the overall structure and interrelationships of object elements, while the database provides specific examples, element values (usually meant to be fairly all-encompassing) of those patterns. Thus the pattern might include "city name" and the database "New Orleans", "Jackson", "Sioux Falls" which are examples of city names that might be found on an envelope.

The systems and apparatus illustrated in FIG. 1 and FIG. 13 may be understood to correspond with, or provide functionality for, the systems, apparatus, methods, and processes described previously in the specification, for example those illustrated in any or all of FIGS. 2-12.

One or more of the embodiments illustrated herein provide for the following features:

High accuracy address lookups based on your list of possible incoming or outgoing addresses.

Flexible configuration through address block patterning. The customer may specify the format(s) of addresses that they, the customer, want to match to.

Read address from the bottom up or the top down.

Fuzzy match; auto-correction for; misspelling, abbreviations, aliases, missing words, specific letter associations, abbreviated words, ignorable words and phrases, transposed words, missing words, noise words, and roman numerals.

Unicode support for multiple languages.

Support for numeric and alphabetical ranged addresses.

Flexible configuration through output specification. The customer may specify the output to be returned on a match and on a non-match. It is not even required that output be found on the mail piece. For instance, the customer might configure the directory system to match to a specific address and return the GPS coordinates or just the post-code of that address.

Specify a 'level of sort' to be returned, indicating your confidence in the completeness of an address matched.

Allow for multiple matches where an address is ambiguous or no match at all in that situation.

Address Lookup-up utility that enables you to validate test addresses and real address without having to run a mail piece through your sorter.

Eliminates Character Noise with reduces errors.

Differentiates multiple aliases for a name (e.g. abbreviations or historic names).

Flexible search rules that can define multiple address block patterns.

Provides an address & reverse look-up utility which can debug routing issues.

Output data can be customized (e.g. Postcode, standard address carrier route, or GPS).

Supports outgoing & incoming applications.

Includes a Std. VES interface.

Fully integrates all domestic and foreign Postal Authority data.

The system and apparatus described above can use dedicated processor systems, micro controllers, programmable logic devices, or microprocessors that perform some or all of the operations. Some of the operations described above may be implemented in software and other operations may be implemented in hardware.

The processor can execute instructions or "code" stored in memory. The memory may store data as well. A processor may include, but is not limited to, an analog processor, a digital processor, a microprocessor, multi-core processor, processor array, network processor, etc. The processor may be part of an on-board vehicle control system or system manager, or provided as a portable electronic device capable of interfacing with the vehicle control system either locally or remotely via wireless transmission.

The processor memory may be integrated together with the processor, for example RAM or FLASH memory disposed within an integrated circuit microprocessor or the like. In other examples, the memory comprises an independent device, such as an external disk drive, storage array, or portable FLASH key fob. The memory and processor may be operatively coupled together, or in communication with each other, for example by an I/O port, network connection, etc. such that the processor can read a file stored on the memory. Associated memory may be "read only" by design (ROM) by virtue of permission settings, or not. Other examples of memory include but are not limited to WORM, EPROM, EEPROM, FLASH, etc. which may be implemented in solid state semiconductor devices. Other memories may comprise moving parts, such a conventional rotating disk drive. All such memories are "machine readable" in that they are readable by a processor.

As explained above, the present invention may be implemented or embodied in computer software (also known as a "computer program" or "code"). Programs, or code may be stored in a digital memory that can be read by the processor. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate processor. By the term "computer-readable" we do not intend to limit the phrase to the historical usage of "computer" to imply a complete mainframe, mini-computer, desktop or even laptop computer. Rather, we use the term to mean that the storage medium is readable by a processor or any computing system. Such media may be any available media that is locally and/or remotely accessible by a computer or processor, and it includes both volatile and non-volatile media, removable and non-removable media.

Where a program has been stored in a computer-readable storage medium, we may refer to that storage medium as a computer program product. For example, a storage medium may be used as a convenient means to store or transport a computer program.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A mail sorting system, comprising:
an imaging device configured to obtain an image of a mail piece being sorted;
an image recognition device configured to process the image into image data;
a processor configured to:
compare the image data with a plurality of patterns, wherein each of the plurality of patterns are associated with a corresponding confidence threshold, and wherein the plurality of patterns identify spatial information of corresponding pattern field elements;
determine a confidence level of the comparison of the image data according to a success in matching the image data with the pattern field elements;
compare the confidence level with the confidence threshold associated with the pattern;
if the confidence threshold is met, select the corresponding pattern; and
assemble output associated with the selected pattern, wherein the output corresponds to a predetermined format; and
an output device configured to apply the output to the mail piece.

2. The image capture system of claim 1, wherein the image recognition device includes optical character recognition, and wherein the imaging recognition device is further configured to parse the image data into a region of interest, sometimes called an address block comprising a plurality of lines.

3. The image capture system of claim 2, wherein the plurality of lines comprise numeric or textual data, and wherein the processor is further configured to compare a line in the address block with one or more of the pattern field elements.

4. The image capture system of claim 3, wherein the processor is further configured to:
match the line of the address block with the one or more pattern field elements; and
compare a second line of the address block with another pattern field element, wherein matching the line with the one or more pattern field elements improves a probability of matching the second line with the other pattern field element.

5. The image capture system of claim 1, wherein if the confidence threshold is not met, the processor is further configured to:
compare the image data with a second pattern, wherein the second pattern identifies spatial information of a second set of pattern field elements;
determine a second confidence level of the comparison of the image data according to a success in matching the image data with the second set of pattern field elements;
compare the second confidence level with a second confidence threshold associated with the second pattern; and
if the second confidence threshold is met, select the second pattern.

6. The image capture system of claim 5, wherein a plurality of patterns are priority weighted according to an order of comparison with the image data, and wherein the second and subsequent pattern has a lower weighted priority than the pattern that preceded the second pattern.

7. The image capture system of claim 1, wherein the output device is configured to apply the output by spraying or printing the output on the mail piece.

8. A method, comprising:
obtaining an image of an area of interest of a mail piece;
processing the image to obtain image data associated with the area of interest;
comparing the image data with a pattern, wherein the pattern identifies spatial information of corresponding pattern field elements of the pattern;
determining a confidence level of the comparison of the image data according to a success in matching the image data with the pattern fields;
comparing the confidence level with a confidence threshold associated with the pattern, wherein each pattern of a plurality of patterns is associated with a corresponding confidence threshold;
selecting the pattern;
identifying a pattern output associated with the selected pattern, wherein the pattern output corresponds to a predetermined output format; and
applying the pattern output to the mail piece.

9. The method of claim 8, wherein the image data comprises a destination address of the mail piece, and wherein the predetermined output format includes geo-positional data.

10. The method of claim 8, further comprising:
parsing the image data of the area of interest as a plurality of lines of input data; and
comparing a line of the input data with one or more of the pattern field elements.

11. The method of claim 10, further comprising:
identifying matching records associated with the line of input data; and
comparing a second line of the input data with another pattern field using data corresponding with the matching records.

12. The method of claim 8, further comprising:
comparing the image data with a second pattern, wherein the second pattern identifies spatial information of a second set of pattern field elements;
determining a second confidence level of the comparison of the image data according to a success in matching the image data with the second set of pattern field elements; and
comparing the second confidence level with a second confidence threshold associated with the second pattern.

13. The method of claim 8, further comprising comparing the image data with the plurality of patterns, wherein the plurality of patterns are associated with different confidence thresholds, and wherein the selected pattern is associated with the corresponding confidence threshold that is first met by the comparison.

14. A non-transitory memory device having stored thereon computer-executable instructions that, in response to execution by a sorting system, cause the sorting system to perform operations comprising:
loading a set of sample input data images corresponding to a plurality of input data images into the sorting system, wherein the plurality of input data images each contain a defined area of interest;
loading descriptions of the set of sample input data images, wherein the defined area of interest is associated with at least one description;
generating patterns based on the set of sample input data images and the descriptions, wherein a different pattern is generated for each combination of the defined area of interest and the at least one description;
specifying a confidence threshold for the patterns, wherein the confidence threshold identifies to what extent image data of a mail piece being sorted must match a particular pattern before a match is verified in a sorting operation;
comparing the image data with the patterns;
selecting a pattern that corresponds to the confidence threshold that has been met by the comparison;
identifying output associated with the selected pattern, wherein the output corresponds to a predetermined output format; and
applying the output to the mail piece.

15. The memory device of claim 14, wherein the operations further comprise weighting the patterns according to a priority of order in comparing the patterns with the image data during the sorting operation.

16. The memory device of claim 14, wherein the descriptions identify one or more locations of data fields in the patterns, and wherein the data fields are used to match the patterns with the image data.

17. The memory device of claim 16, wherein a different set of data fields are associated with each of the patterns, and wherein a plurality of different patterns are generated for the sample input data images.

18. The memory device of claim 16, wherein the patterns are associated with one or more aliases for certain of the data fields or components.

19. The memory device of claim 14, wherein the method further comprises cycling through the patterns according to a priority weighting of the patterns, and wherein said selecting a pattern comprises selecting the pattern having both a highest priority weighting and that corresponds to the confidence threshold.

20. A non-transitory computer-readable medium having stored thereon a data structure, comprising:
one or more directories including a number of entries, wherein each entry includes indexed data that provides for an identification of a desired output;
a plurality of patterns including a number of data fields, wherein the plurality of patterns identify a spatial relationship of the data fields, and wherein the data fields are related to the indexed data according to both the spatial relationship and a description of a corresponding pattern; and
image data corresponding to an area of interest of a mail piece, wherein the image data is parsed into a plurality of lines that are compared with the patterns and the indexed data to determine a confidence level, wherein each of the plurality of patterns is associated with a corresponding confidence threshold that determines if the confidence level is sufficient to determine that the desired output has been identified, wherein a pattern is selected based, at least in part, on comparing the confidence level with the confidence threshold, wherein the desired output is associated with the selected pattern and corresponds to a predetermined format, and wherein the desired output is applied to the mail piece.

* * * * *